US011579287B2

(12) United States Patent
Tierney et al.

(10) Patent No.: US 11,579,287 B2
(45) Date of Patent: Feb. 14, 2023

(54) MILLIMETER-WAVE RADAR FOR UNMANNED AERIAL VEHICLE SWARMING, TRACKING, AND COLLISION AVOIDANCE

(71) Applicant: The Government of the United States of America, as represented by the Secretary of the Navy, Arlington, VA (US)

(72) Inventors: Brian Tierney, Fairfax, VA (US); Christopher T. Rodenbeck, Annandale, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 269 days.

(21) Appl. No.: 16/750,670

(22) Filed: Jan. 23, 2020

(65) Prior Publication Data
US 2020/0284901 A1    Sep. 10, 2020

Related U.S. Application Data

(60) Provisional application No. 62/795,598, filed on Jan. 23, 2019.

(51) Int. Cl.
*G01S 13/933* (2020.01)
*B64C 39/02* (2006.01)
*G01S 13/44* (2006.01)
*G01S 13/00* (2006.01)

(52) U.S. Cl.
CPC .......... *G01S 13/933* (2020.01); *B64C 39/024* (2013.01); *G01S 13/4418* (2013.01); *G01S 13/4463* (2013.01); *B64C 2201/12* (2013.01)

(58) Field of Classification Search
CPC ............... G01S 13/933; G01S 13/4418; G01S 13/4463; G01S 13/343; G01S 13/42; G01S 13/584; G01S 7/415; G01S 13/426; G01S 13/28; G01S 13/524; G01S 13/13; G01S 13/5242; B64C 39/024; B64C 2201/12; B64C 2201/143; H01Q 1/26; H01Q 1/246; H01Q 21/22; H01Q 21/205; H01Q 1/3233
See application file for complete search history.

(56) References Cited

U.S. PATENT DOCUMENTS 2,126,531 A * 8/1938 Carter .................. H01Q 21/205
343/844
3,780,372 A * 12/1973 Unz ....................... H01Q 21/22
367/905

(Continued)

FOREIGN PATENT DOCUMENTS

| GB | 2382229 A | * | 5/2003 | ............. H01Q 1/246 |
| GB | 2463987 A | * | 4/2010 | ........... G01S 13/426 |

*Primary Examiner* — Bernarr E Gregory
(74) *Attorney, Agent, or Firm* — US Naval Research Laboratory; William Ladd

(57) ABSTRACT

Systems and methods are provided for adapting automotive mmW radar technology to meet the requirements of autonomous unmanned aerial vehicle (UAV) systems. Embodiments of the present disclosure provide solutions for several design challenges from this adaptation, such as utilizing a limited number of antenna channels to scan in both azimuth and elevation.

19 Claims, 23 Drawing Sheets

(56) References Cited

U.S. PATENT DOCUMENTS

| | | | | |
|---|---|---|---|---|
| 5,113,194 A | * | 5/1992 | Krikorian | G01S 13/524 342/194 |
| 5,784,026 A | * | 7/1998 | Smith | G01S 13/5242 342/162 |
| 7,973,699 B2 | * | 7/2011 | Krikorian | G01S 7/415 342/28 |
| 8,760,340 B2 | * | 6/2014 | Smith | G01S 13/524 342/149 |
| 9,194,947 B1 | * | 11/2015 | Mohamed | G01S 13/28 |
| 9,310,478 B2 | * | 4/2016 | Gross | H01Q 1/3233 |
| 2010/0245159 A1 | * | 9/2010 | Krikorian | G01S 7/415 342/189 |

* cited by examiner

11,579,287 B2

MILLIMETER-WAVE RADAR FOR UNMANNED AERIAL VEHICLE SWARMING, TRACKING, AND COLLISION AVOIDANCE

CROSS REFERENCE TO RELATED APPLICATIONS

This application claims the benefit of U.S. Provisional Patent Application No. 62/795,598, filed on Jan. 23, 2019, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, D.C. 20375, USA; +1.202.767.7230; techtran@nrl.navy.mil, referencing Navy Case Number 106334-USS.

FIELD OF THE DISCLOSURE

This disclosure relates to radar systems, including millimeter-wave radar systems.

BACKGROUND

Applications for autonomous and unmanned systems include pursuit, formation flight, terminal guidance, and collision avoidance. However, sensor solutions that enable these applications have thus far focused on: (i) cameras, which are ineffective in darkness, sun glare, rain, and fog; (ii) Global Positioning System (GPS), which can be denied or spoofed; and (iii) surface radar, which can be either too expensive or too inaccurate.

Millimeter-wave (mmW) radar performs well in degraded visual environments. It can also be small enough and cheap enough to mount onto an unmanned aerial vehicle (UAV) for onboard sensing.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
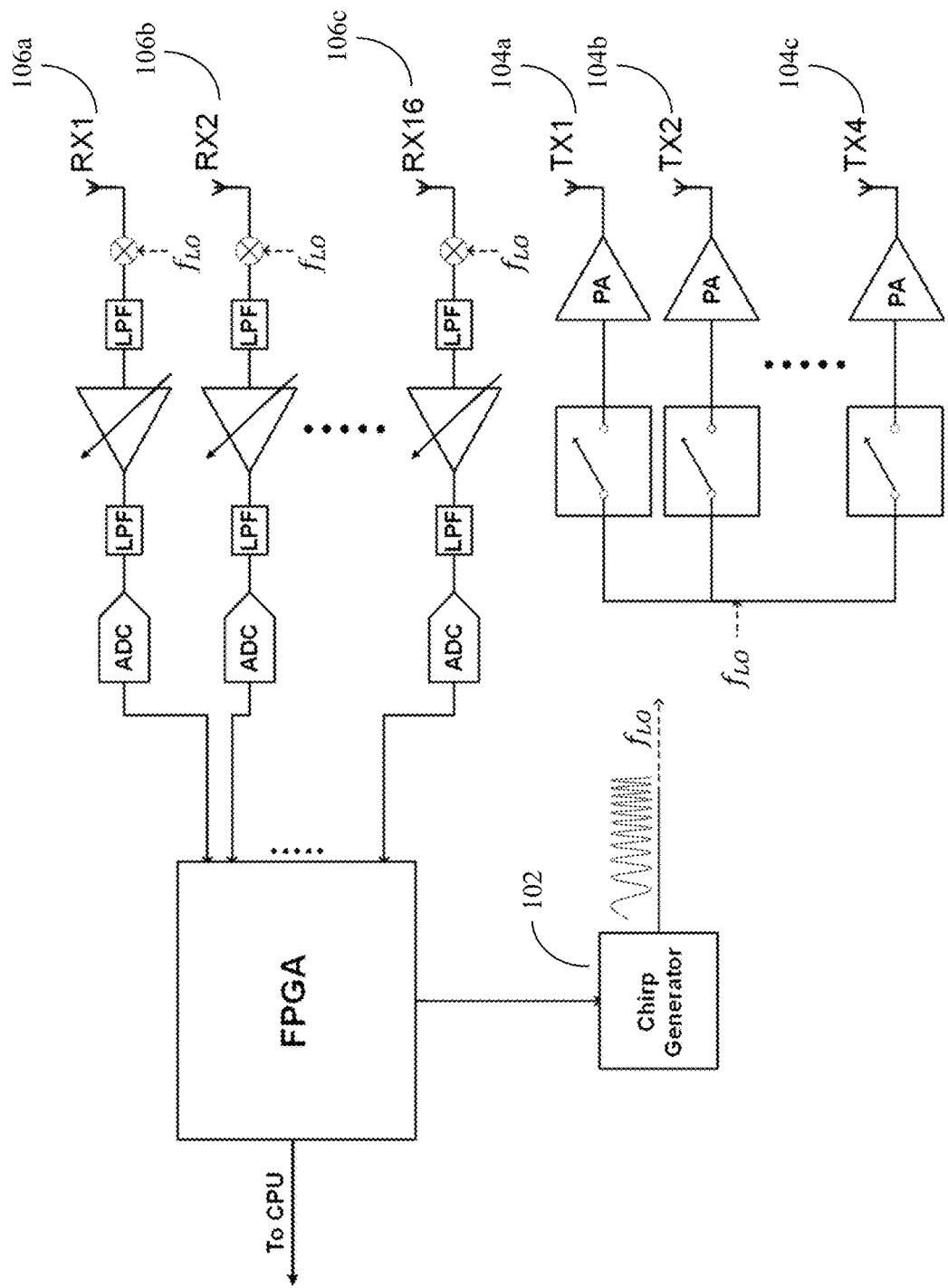
FIG. 1 is an exemplary diagram of a radar system in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure adapt automotive mmW radar technology to meet the requirements of autonomous unmanned aerial vehicle (UAV) systems. Embodiments of the present disclosure provide solutions for several design challenges from this adaptation, such as utilizing a limited number of antenna channels to scan in both azimuth and elevation.

2. Exemplary Radar System

It is useful for UAV swarming algorithms to have the ability to perceive relative range and bearing of UAV peers within the swarm. Typically, the members of the swarm are displaced in azimuth, rather than elevation. Therefore, it is useful for UAV swarming algorithms to have a broad field of view and good angular estimation in azimuth while tolerating a narrower field of view and lower fidelity angular estimation in elevation. With this in mind, design requirements for a UAV in accordance with an embodiment of the present disclosure include broad field-of-view in azimuth, high-fidelity angular estimation in azimuth, adequate ($\approx 20°$) field-of-view in elevation, and high antenna gain. In an embodiment, by sacrificing performance in elevation, antenna gain can be improved without the need to include additional antennas. This reduces the cost of the sensor with minimal sacrifice to performance for the aforementioned UAV applications.

FIG. 1 is an exemplary diagram of a radar system in accordance with an embodiment of the present disclosure. In an embodiment, radar system of FIG. 1 is a frequency-modulated continuous-wave radar (FMCW) multiple-input multiple-output (MIMO) radar system employing digital beamforming. In FIG. 1, linear frequency-modulated chirp signal is generated by chirp generator 102 and sequentially transmitted by the array of transmit (TX) antennas 104. A signal reflected by an object is collected by the array of receive (RX) antennas 106, converted to the digital domain, and ultimately sent to a central processing unit (CPU).

In an embodiment, a linearly-modulated chirp waveform is generated and transmitted sequentially by the four transmit (TX) antennas 104, as shown in FIG. 1, to enable MIMO processing techniques. In an embodiment, the signals reflected by nearby objects are received by the 16 receive (RX) antennas 106 and down-converted to baseband frequencies using stretch processing, i.e. the received signal is mixed directly with the chirp waveform. The output frequencies of the mixer can be directly related to the object range using Equation (1).

$$\text{Range} = \frac{c\tau f_B}{2\beta} \quad (1)$$

In Equation (1), c is the speed of light, $\tau$ is the duration of the linear modulation, $\beta$ is the bandwidth of the linear modulation, and $f_B$ is the output frequency of the mixer. Each of the 16 RX channels is then sampled digitally using its own RX chain, which consists of low-pass filters, a variable-gain amplifier, and an analog-to-digital converter (ADC). The signals can then be beamformed digitally, providing processing gain as well as the capacity for angular estimation of the object location.

Figure 2:
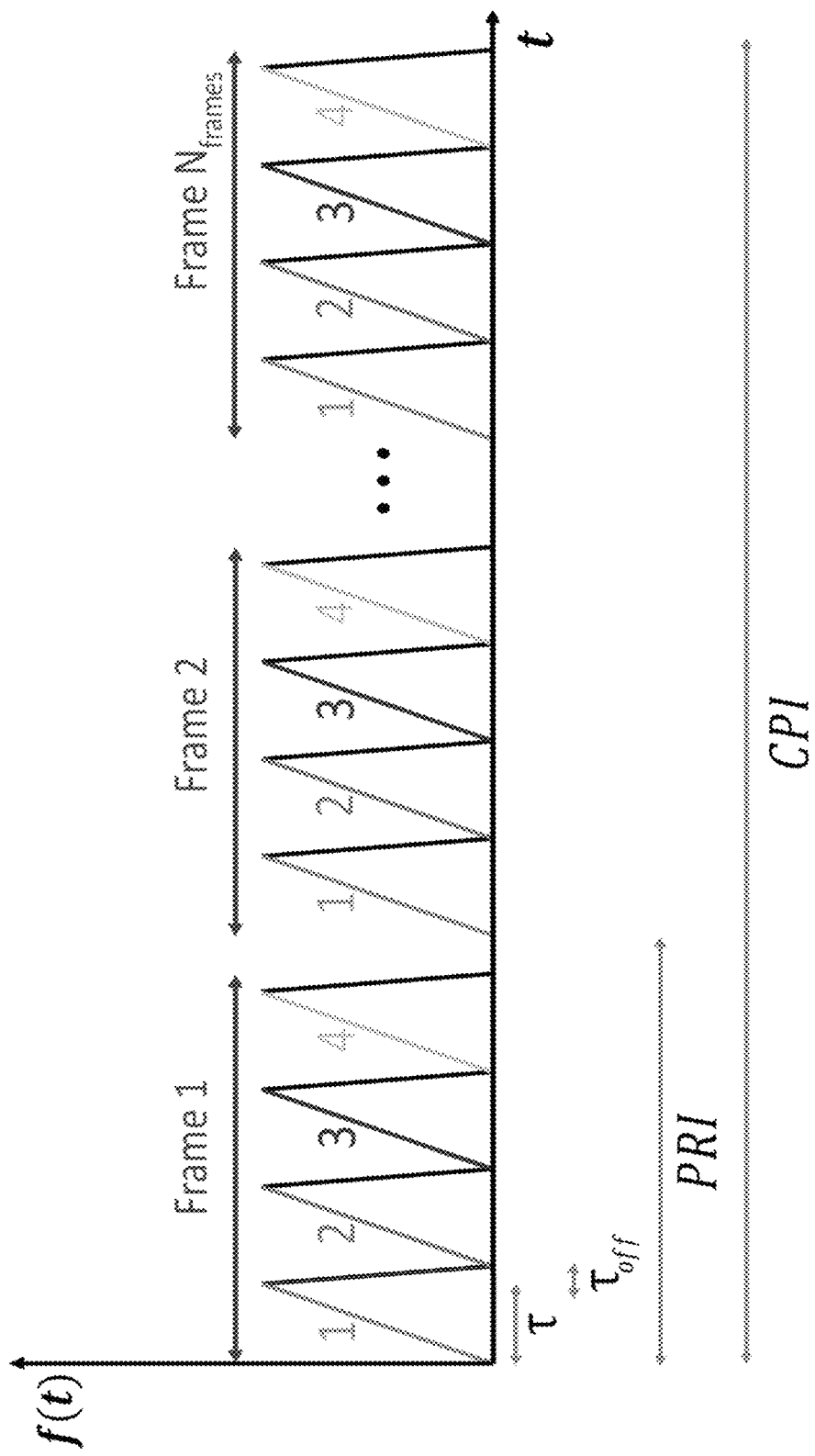
FIG. 2 shows a diagram illustrating exemplary FMCW transmission waveforms for the radar system of FIG. 1.

FIG. 2 shows a diagram illustrating exemplary FMCW transmission waveforms for the radar system of FIG. 1. In FIG. 2, a linear frequency-modulated chirp is sequentially transmitted by the array of 4 transmit antennas. This time-division multiplexing allows MIMO processing. In an embodiment, the waveform generation is produced using a transmitter chip in conjunction with a companion complementary metal-oxide-semiconductor (CMOS) chip which provides a fully digital interface to the transmitter chip. In an embodiment, the waveform is amplified by a dual power amplifier and fed to the transmit (TX) antennas. The TX antennas can be activated sequentially by means of digital control signals. In an embodiment, the signal received by receive (RX) antennas is fed to receiver chips, which perform stretch processing. In an embodiment, analog to digital converter (ADC) chips include a low-pass filter and variable-gain amplifier.

Figure 3:
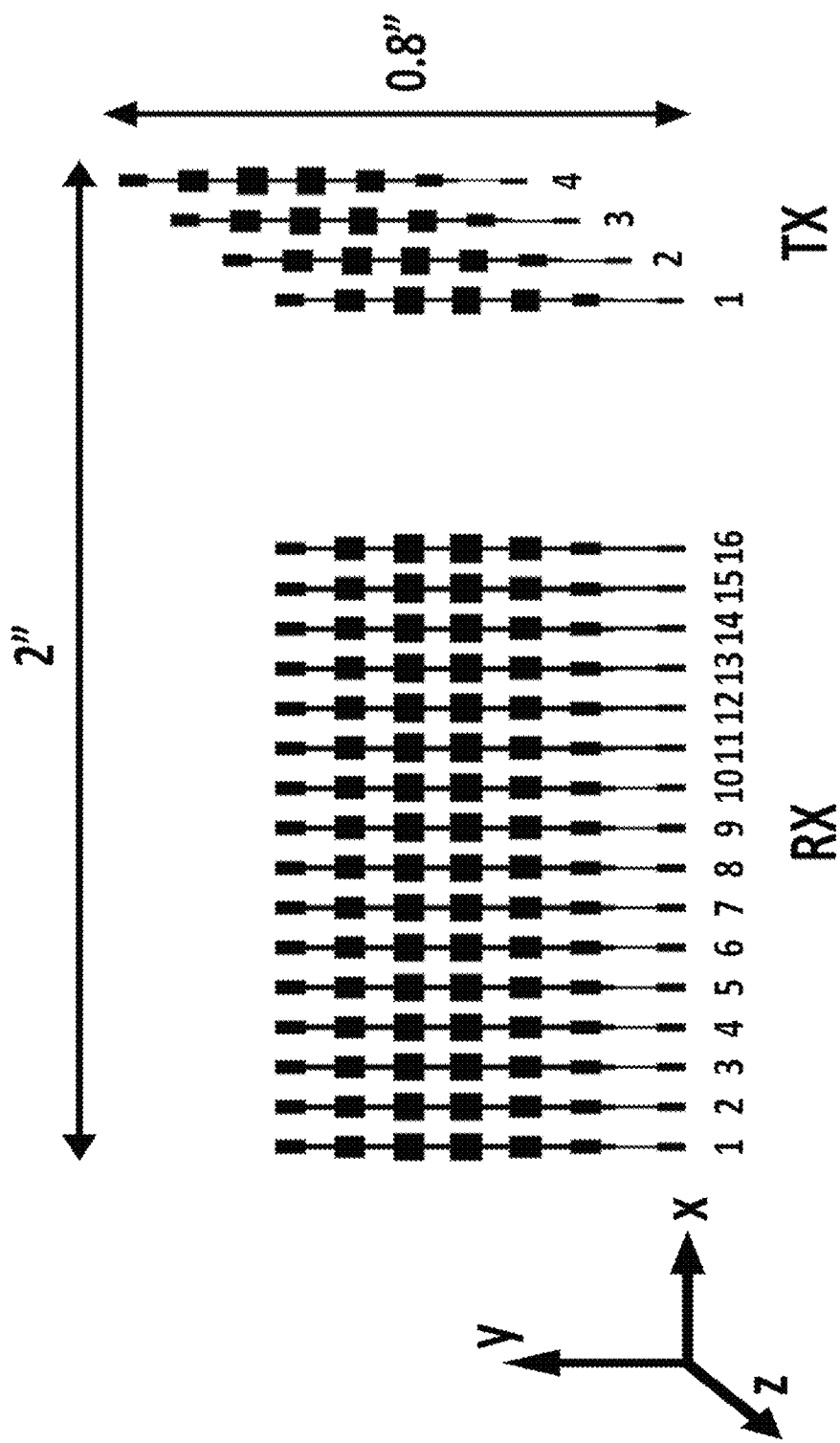
FIG. 3 is a diagram of an exemplary MIMO antenna array design in accordance with an embodiment of the present disclosure.

FIG. 3 is a diagram of an exemplary MIMO antenna array design in accordance with an embodiment of the present disclosure. In an embodiment, the MIMO antenna array design of FIG. 3 includes 16 RX antennas and 4 TX antennas. In an embodiment, microstrip series-fed patch antennas are used as array elements. In an embodiment, the 16 RX antennas are spaced vertically by $\lambda/2$ (2 mm), providing angular estimation in azimuth, and the 4 TX antennas are also spaced vertically by $\lambda/2$ and horizontally by $\lambda/2$, which provides angular estimation in elevation. In an embodiment, the estimation in azimuth is better than that in elevation.

Figure 4:
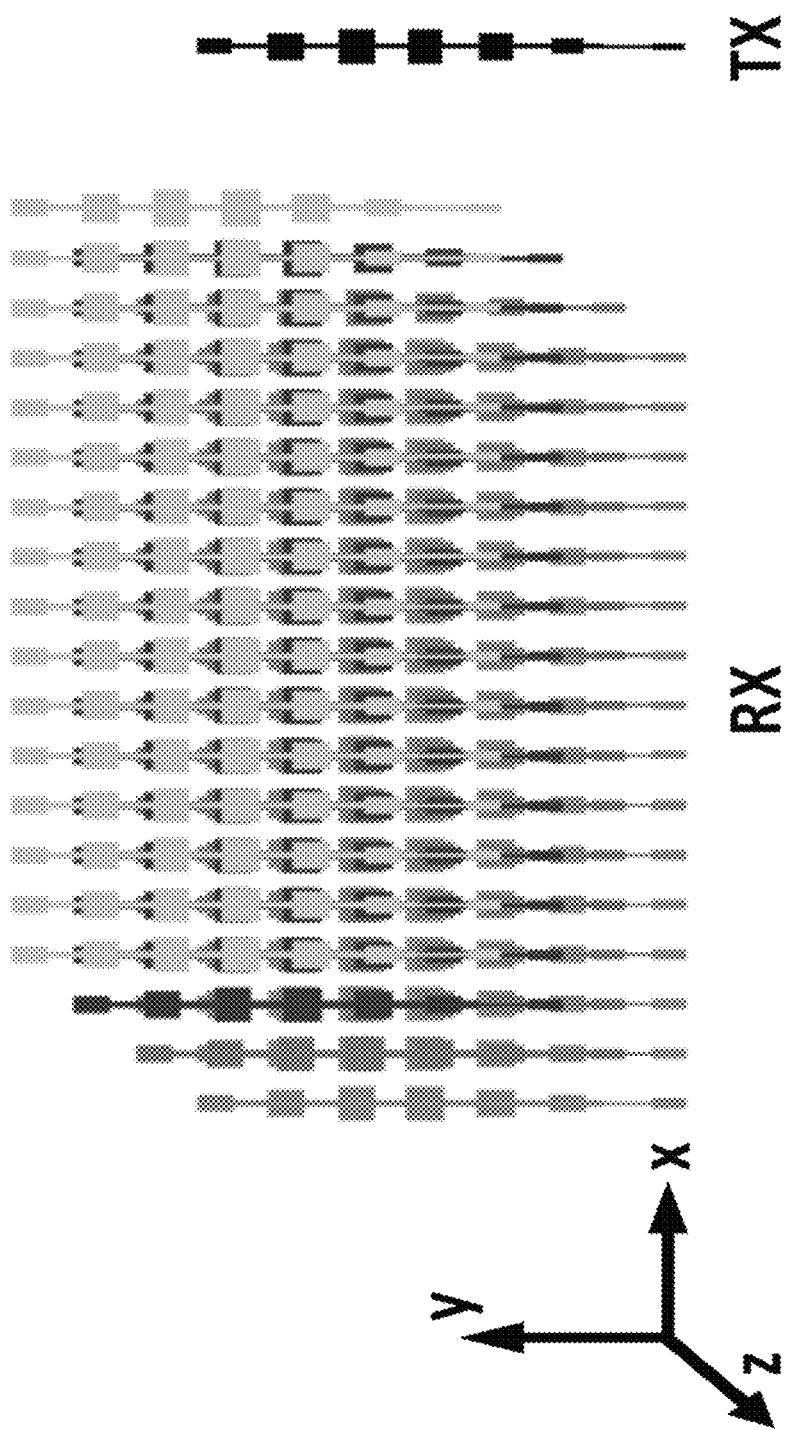
FIG. 4 is a diagram of a virtual array for the MIMO antenna design of FIG. 3 in accordance with an embodiment of the present disclosure.

FIG. 4 is a diagram of a virtual array for the MIMO antenna design of FIG. 3 in accordance with an embodiment of the present disclosure. The scanning capabilities of the MIMO array can be understood by considering the equivalent virtual array of FIG. 4, which looks similar to a standard 16 by 4 array. The dimensional asymmetry results in superior scanning in azimuth. The virtual array of FIG. 4 includes 1 TX antenna and 64 RX antennas. These RX antennas often overlap in this virtual space but are electrically isolated in physical space. The result is a compact array with beam scanning in both elevation and azimuth while maintaining high antenna gain.

Figure 5:
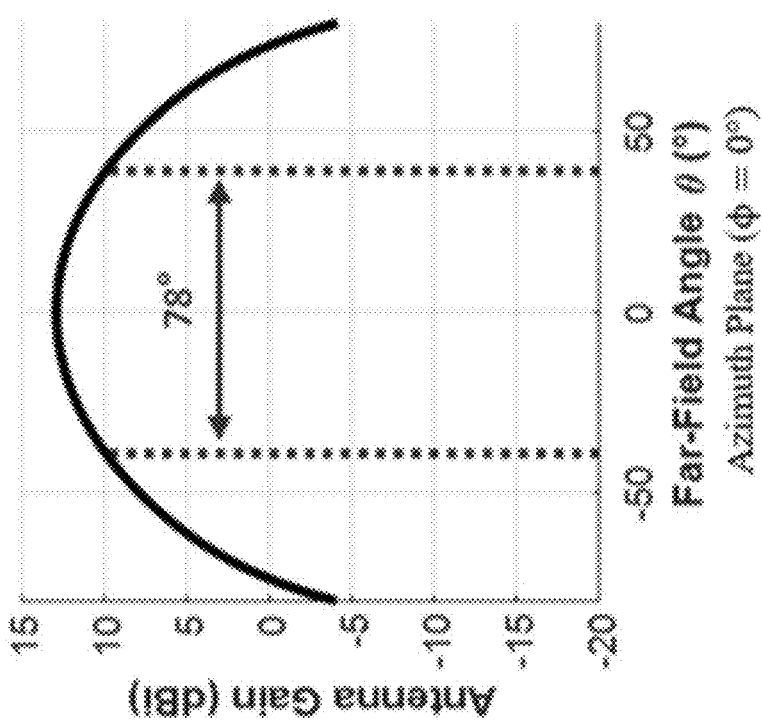
FIG. 5 shows diagrams of simulated radiation patterns for a series-fed patch antenna array element in the elevation plane and azimuth plane in accordance with an embodiment of the present disclosure.
Figure 5:
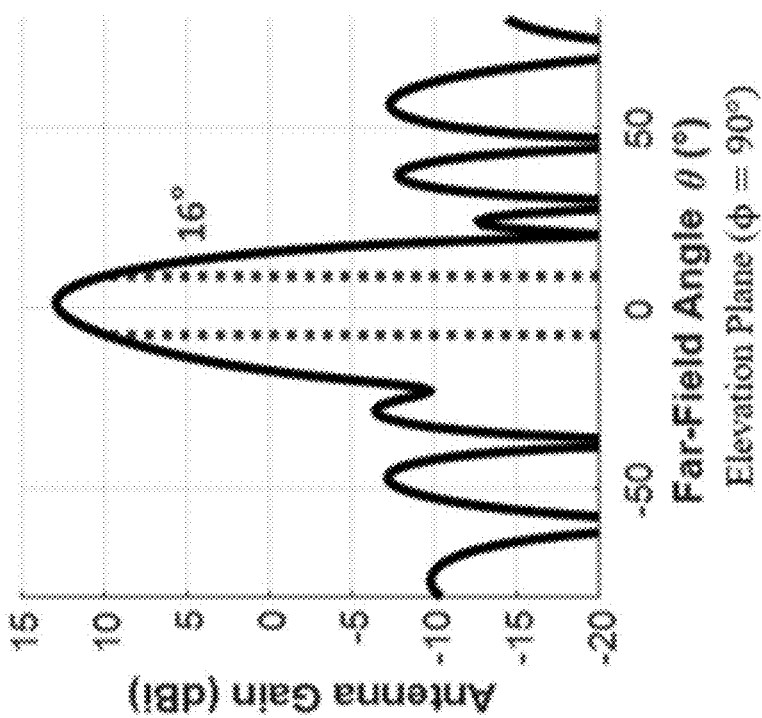

FIG. 5 shows diagrams of simulated radiation patterns for a series-fed patch antenna array element in the elevation plane and azimuth plane in accordance with an embodiment of the present disclosure. Scanning in elevation is constricted by the narrow element pattern in elevation, as illustrated in FIG. 5. Indeed, for large beam scan angles of the array factor, the achieved angle of the main beam is actually much smaller. However, this angular discrepancy does not affect angular estimation algorithms, which rely on achieving maximum received power when the array factor scan angle matches that of the object location. Table 1 shows exemplary antenna parameters of a single array element as well as the entire array in accordance with an embodiment of the present disclosure.

TABLE 1

| | Gain (dBi) | Radiation Efficiency | Elevation Beamwidth (3 dB) | Azimuth Beamwidth (3 dB) |
|---|---|---|---|---|
| Single Element | 12.9 | 66.9% | 780° | 16° |
| RX Array (Uniform Weighting) | 23.9 | 74% | 70° | 16° |
| RX Array (Hanning Weighting) | 22.3 | 74% | 11° | 16° |
| TX Array (Uniform Weighting) | 19.6 | 72% | 26° | 14° |

3. Exemplary System Analysis

In an embodiment, the parameters of a MIMO FMCW radar system include the center operating frequency of the radar ($f_0$), the power transmitted from a single transmit antenna ($P_{TX}$), the number of transmit (TX) antennas used ($N_{TX}$), the number of receive (RX) antennas used ($N_{RX}$), the RX array gain as a function of object position ($\theta,\phi$) ($G_{Rx}(\theta,\phi)$), the TX array gain as a function of object position ($\theta,\phi$) ($G_{TX}(\theta,\phi)$), the pulse length ($\tau$), the time during which all transmitters are off ($\tau_{off}$), the bandwidth of the transmitted radar chirp ($\beta$), the time between the start of frames (pulse repetition interval) (PRI), the number of digital samples per chirp (N), the number of frames in a single coherent processing interval (CPI) ($N_{frames}$), the noise temperature seen by the antennas ($T_{scene}$), the noise figure of the receive chain (F), and Estimated losses from the atmosphere, digital signal processing, etc. (L). Equation (2) provides an expression for the signal-to-noise ratio (SNR) of a return signal in accordance with an embodiment of the present disclosure.

$$SNR(\theta, \phi) = \frac{P_{TX} * N_{TX} * G_{RX}(\theta, \phi) * G_{TX}(\theta, \phi) * \lambda^2 * \sigma * N_{frame} * \tau}{(4\pi)^3 * R^4 * k * T_{scene} * F * L} \quad (2)$$

In Equation (2), $\lambda$ represents the free-space wavelength with $f_0$, $\sigma$ represents the radar cross section (RCS) of the object, R represents the object range, and k represents Boltzmann's constant ($1.38 \cdot 10^{-23}$ m² kg s⁻² K⁻¹). Table 2 shows exemplary parameters for a radar system in accordance with an embodiment of the present disclosure.

TABLE 2

| | |
|---|---|
| $f_0$ | 76.5 GHz |
| $P_{TX}$ | 10 mW (10 dBm) |
| $N_{TX}$ | 4 |
| $N_{RX}$ | 16 |
| $G_{RX}$ (at Broadside) | 22.3 dBi |

TABLE 2-continued

| | |
|---|---|
| $G_{TX}$ (at Broadside) | 19.6 dBi |
| $\tau$ | 102.4 μs |
| $\tau_{off}$ | 64 μs |
| $\beta$ | 300 MHz |
| PRI | 665.6 μs |
| N | 512 (real samples) |
| $N_{frames}$ | 64 |
| $T_{scene}$ | 290 K |
| F | ≈15 dB |
| L | ≈2 dB |

In an embodiment, object detection is triggered when the SNR of a returned signal exceeds a pre-determined threshold. In an embodiment, a threshold of 10 dB coupled with binary integration is used. Equations (3) and (4) for unambiguous range and range rate are shown below.

$$\text{Unambiguous Range} = \frac{N * c}{4 * \beta} \quad (3)$$

$$\text{Unambiguous Range Rate} = \frac{c}{4 * PRI * f_0} \quad (4)$$

In an embodiment, the unambiguous range and range rate are 128 meters and 1.47 m/s, respectively. However, disambiguation techniques, such as the Chinese Remainder Theorem or finite-difference techniques, can be used to extend discernable range and range rate. Equation (5) provides an expression for the range resolution of a radar in accordance with an embodiment of the present disclosure.

$$\text{Range Resolution} = \frac{c}{2\beta} \quad (5)$$

In an embodiment, the range resolution is 0.5 meters. Note, however, that this is not the same as the accuracy of the range prediction. Indeed, the accuracy of range estimation can surpass the range resolution. Rather, this quantifies how well two objects in range can be separated. In an embodiment, the range resolution is also equal to the size of the range bins, unless zero padding is employed. Otherwise, the equation for range bin size is given by Equation (6).

$$\text{Range Bin Size} = \frac{N * c}{2 * \beta * N_{FFT}} \quad (6)$$

In Equation (6), $N_{FFT}$ is the length of the FFT (including zero padding) in fast time. In an embodiment, zero padding is not employed.

4. Exemplary Signal Processing

Figure 6:
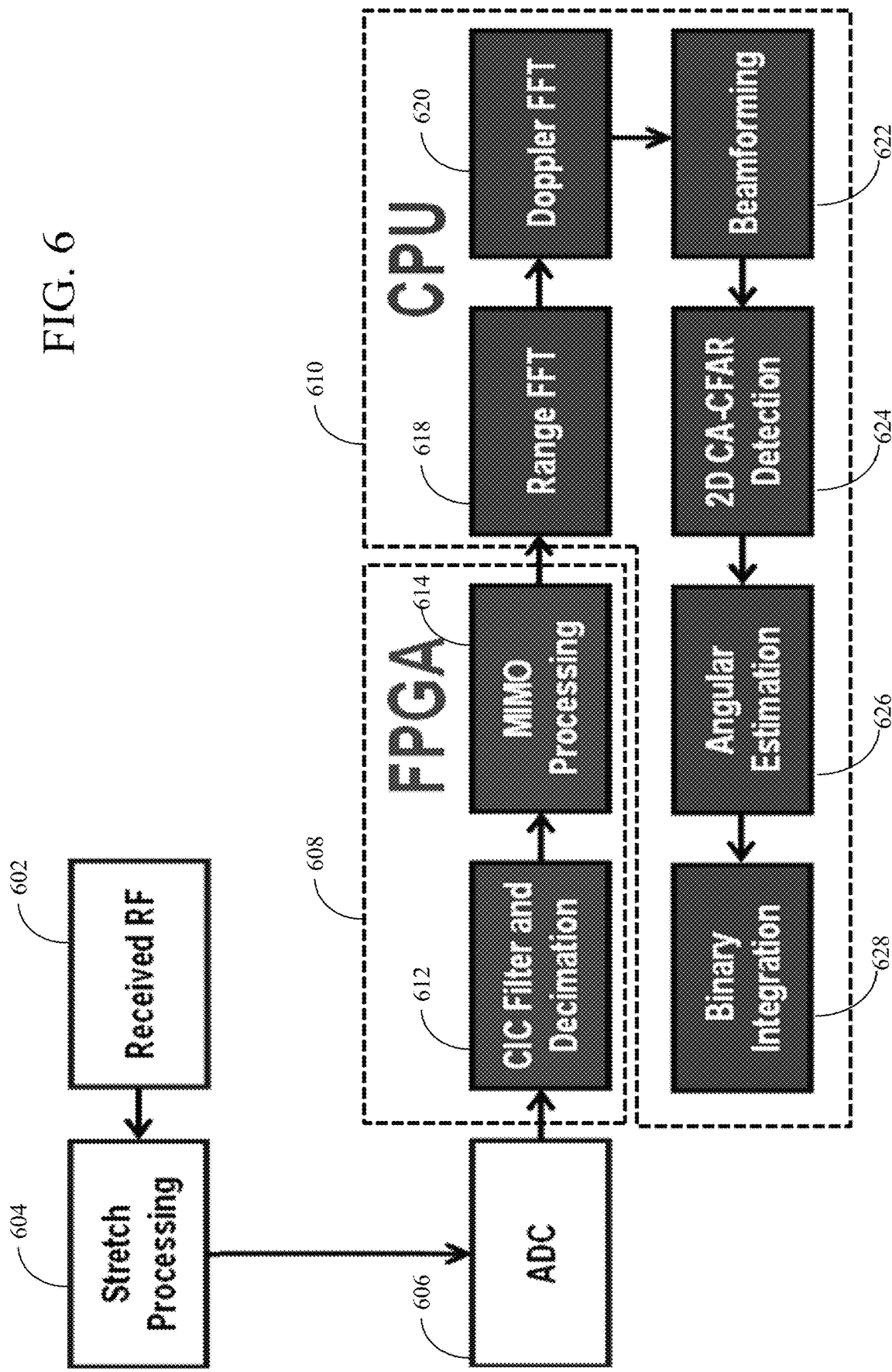
FIG. 6 is a block diagram illustrating exemplary signal processing for a radar system in accordance with an embodiment of the present disclosure.

FIG. 6 is a block diagram illustrating exemplary signal processing for a radar system in accordance with an embodiment of the present disclosure. In FIG. 6, the received radio frequency (RF) signal 602 is processed by stretch processing 604, mixed down to baseband frequencies and subsequently sampled by the analog-to-digital converter (ADC) 606. In an embodiment, the signal is then sent to FPGA 60 and then to central processing unit (CPU) 610. In an embodiment, the signal is oversampled, and samples are subsequently fed through a cascaded integrator-comb (CIC) filter 612 and decimation stage (e.g., to reduce the quantization noise of ADC 606). In an embodiment, a decimation rate of 8 is employed for the system, resulting in an ADC sampling frequency of 40 MHz.

In an embodiment, after decimation, MIMO processing 614 is performed by the field-programmable gate array (FPGA). For the time-division multiplexing scheme employed, this can amount to simply separating the received signal based on what transmitter is currently active. In an embodiment, FPGA 608 then transfers the data stream to CPU 610 to perform the more complicated signal processing routines.

In an embodiment, CPU 610 first performs a Fast Fourier Transform (FFT) in both fast time (range) 618 and slow time (Doppler) 620 to generate a 2D range-Doppler map. In an embodiment, Hanning windows are used for both FFTs. In an embodiment, the MIMO virtual channels are then beamformed 622 digitally to produce beams at a grid of angles. In an embodiment, a Hanning window is used to weight the elements of the antenna array along its x-axis. The grid of angles includes elevation angles of −15° to 15° by 5° increments and azimuth angles of −35° to 35° by 5° increments.

In an embodiment, this 2D grid includes 105 angles. In an embodiment, after the 105 beams are formed, 2D CA-CFAR (cell-averaging constant false alarm rate) processing 624 can be employed on each beam. In an embodiment, the 2D CA-CFAR processing uses a 1D CA-CFAR algorithm in both dimensions and then registers as a detection any range-Doppler bin that exceeds the signal-to-noise ratio (SNR) threshold in both dimensions. In an embodiment, two-dimensional centroiding is used to cluster detections together. In an embodiment, exemplary CA-CFAR parameters are (1) Number of Guard Cells: 3 in range, 3 in Doppler; (2) Number of Averaging Cells: 3 in range, 3 in Doppler; (3) Centroid Window Size: 2 in range, 2 in Doppler; and (4) SNR threshold: 10 dB in range, 10 dB in Doppler.

In an embodiment, after the CA-CFAR stage, angular estimation 626 is employed. In an embodiment, an angular estimation algorithm is employed that uses Newton's method to perform a maximum-likelihood angle estimation with computational efficiency. Finally, in an embodiment, binary integration 628 can be performed. In an embodiment, binary integration essentially keeps only detections which are present during M of N consecutive CPI, and detections from consecutive CPI are considered to be from the same object if they have similar range, angle, and Doppler. In an embodiment, M=2 and N=4.

5. Alternative Embodiments

Figure 7:
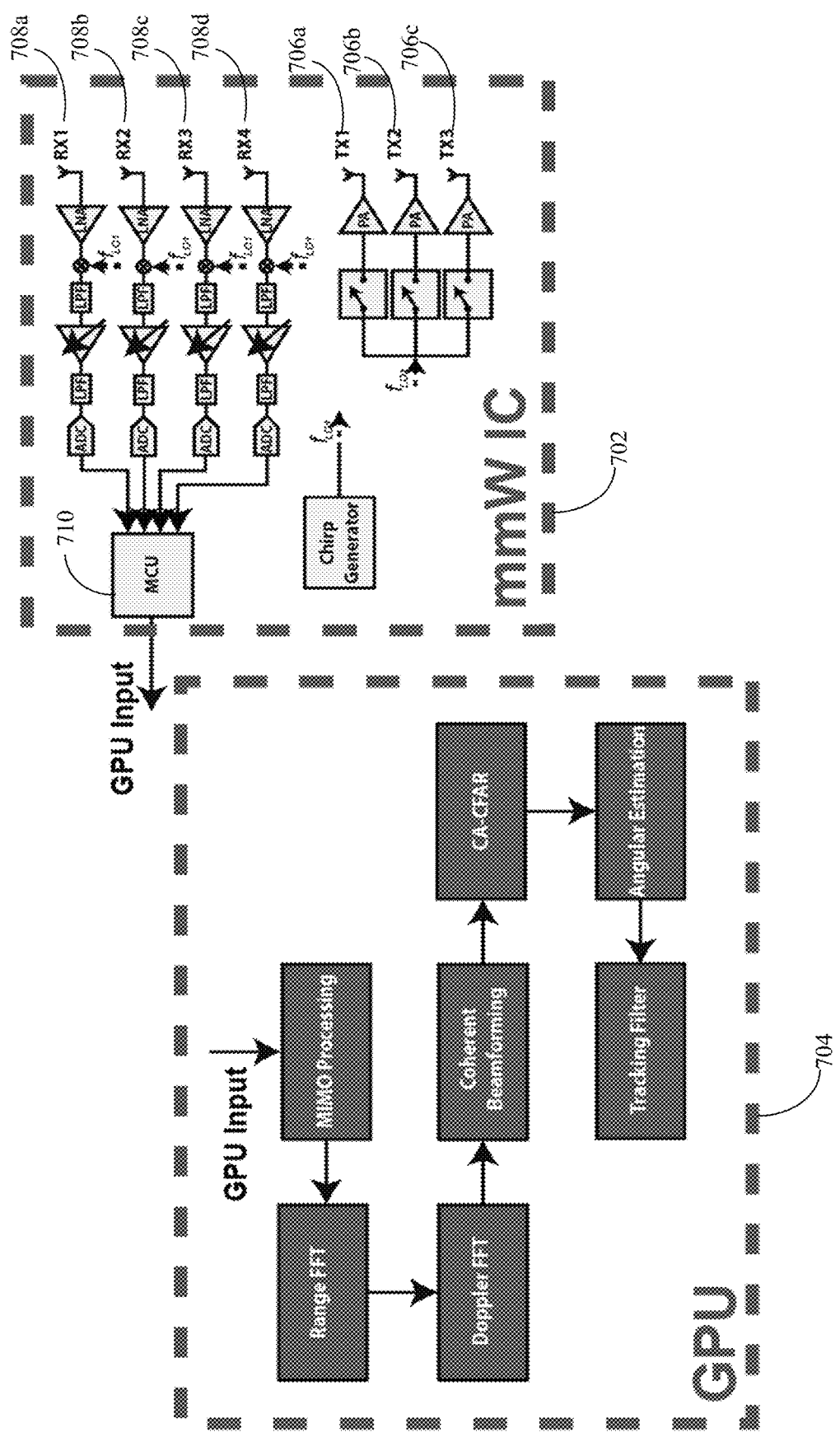
FIG. 7 is a block diagram of another embodiment of a radar system in accordance with embodiments of the present disclosure.

FIG. 7 is a block diagram of another embodiment of a radar system in accordance with embodiments of the present disclosure. The radar system of FIG. 7 includes a millimeter-wave (mmW) integrated circuit (IC) 702 and a graphical processing unit (GPU) 704. In an embodiment, mmW IC 702 generates a prescribed FMCW waveform and transmits the waveform in a time-division-multiplexed sequence using 3 TX antennas 706. In an embodiment, after the signal is reflected from a nearby object, each RX antenna 708 receives the signal, mixes it with the transmitted waveform, and digitizes the signal with an ADC. In an embodiment, although the data is then passed to an on-chip microcontroller (MCU) 710, MCU 710 passes the data on to GPU 704 for processing. In an embodiment, exemplary parameters of the radar system of FIG. 7 are given in Table 3.

TABLE 3

| | | |
|---|---|---|
| $f_0$ | 78 | GHz |
| $P_{TX}$ | 15 | mW (12 dBm) |
| $N_{TX}$ | 3 | |
| $N_{RX}$ | 4 | |
| $G_{RX}$ (at Broadside) | 19.6 | dBi |
| $G_{TX}$ (at Broadside) | 17.6 | dBi |
| $\tau$ | 30 | μs |
| $\tau_{off}$ | 12 | μs |
| $\beta$ | 300 | MHz |
| PRI | 114 | μs |
| N | 256 | (complex I/Q) |
| $N_{frames}$ | 128 | |
| $T_{scene}$ | 290 | K |
| F | ≈16 | dB |
| L | ≈1 | dB |
| Range Resolution | 0.5 | m |
| Unambiguous Range | 128 | m |
| Unambiguous Velocity | 8.4 | m/s |

Figure 8:
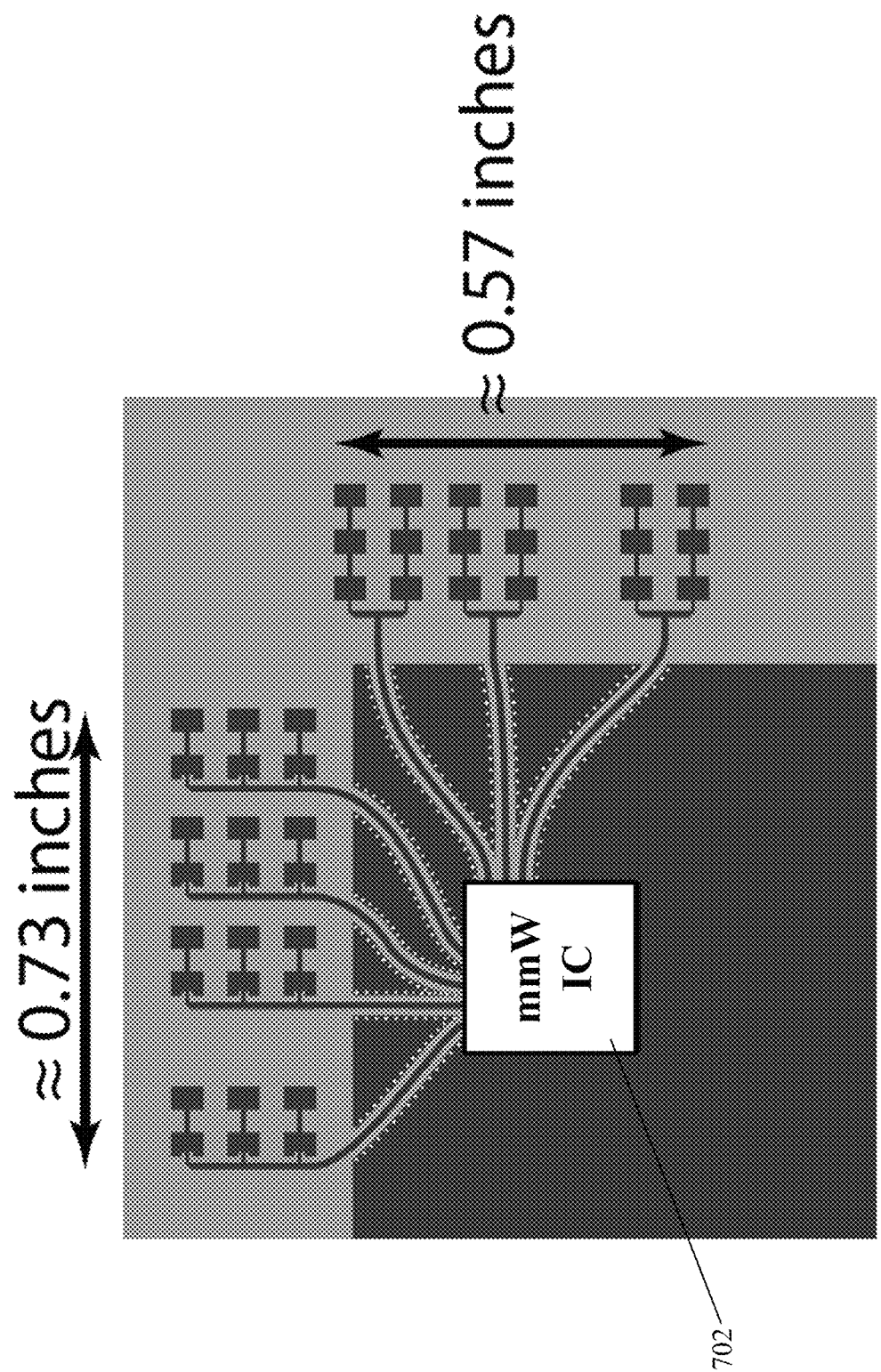
FIG. 8 shows a design of an exemplary antenna system in accordance with an embodiment of the present disclosure.

FIG. 8 shows a design of an exemplary antenna system in accordance with an embodiment of the present disclosure. The dimensions provided in FIG. 8 are shown by way of example and are not limiting. In an embodiment, mmW IC 702 includes 4 RX channels and 3 TX channels (e.g., as shown by FIG. 7). Embodiments of the present disclosure provide systems and methods for detecting nearby objects with a limited number of antenna channels. In an embodiment, the antenna system of FIG. 8 uses large subarray elements to detect nearby objects with a limited number of antenna channels.

In an embodiment, each antenna subarray includes a 2 by 3 grid of microstrip patches. This subarray size provides a sufficiently high gain for nearby small UAVs at the expense of a narrower field-of-view (FOV). In an embodiment, FIG. 8 includes a 2 dimensional (2D) grid of array elements, which enables the antenna system of FIG. 8 to scan in both azimuthal plane and the elevation plane. For example, the 2D grid enables the antenna system of FIG. 8 to detect angular changes along two different axes, which enables the antenna system of FIG. 8 to scan in both azimuthal plane and the elevation plane.

Figure 9:
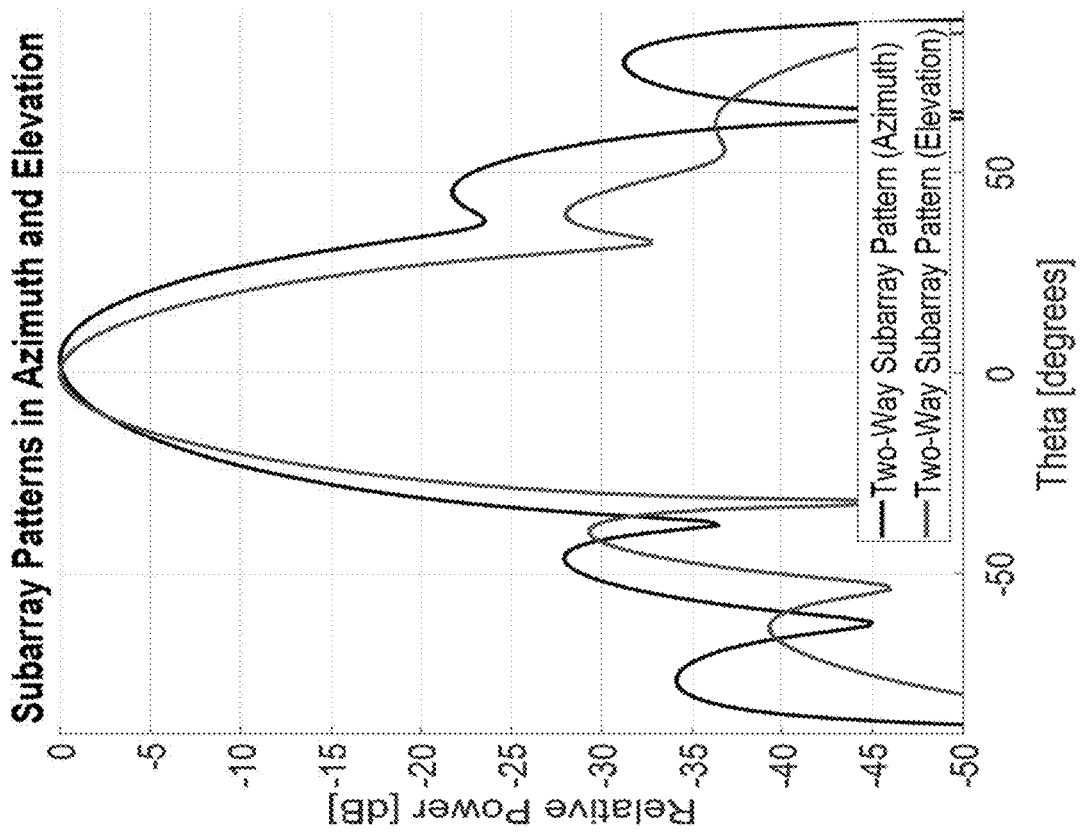
FIG. 9 shows exemplary two-way subarray antenna patterns for the antenna system of FIG. 8 in both the azimuthal plane and elevation plane in accordance with an embodiment of the present disclosure.

FIG. 9 shows exemplary two-way subarray antenna patterns for the antenna system of FIG. 8 in both the azimuthal plane and elevation plane in accordance with an embodiment of the present disclosure. In FIG. 9, the 3-dB beamwidth is approximately 30° in both azimuth and elevation. However, for UAV tracking of a single object, this beamwidth is sufficient. Indeed, a feedback control loop can keep a gimbal-mounted radar pointed directly at an object, even if the object moves suddenly.

Figure 10:
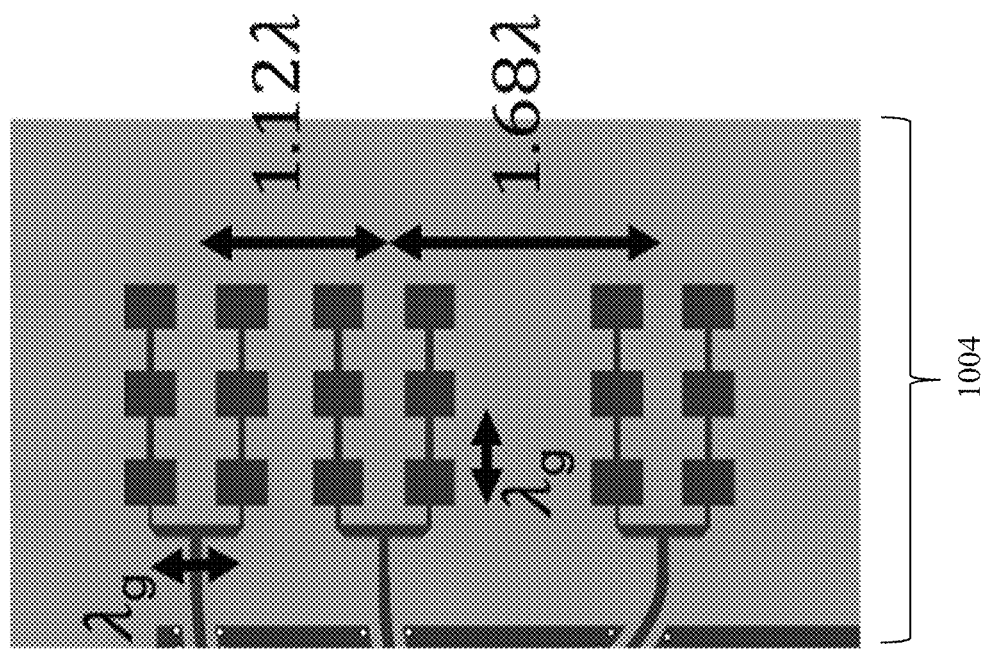
FIG. 10 shows exemplary antenna spacing for the antenna system of FIG. 8 in accordance with an embodiment of the present disclosure.
Figure 10:
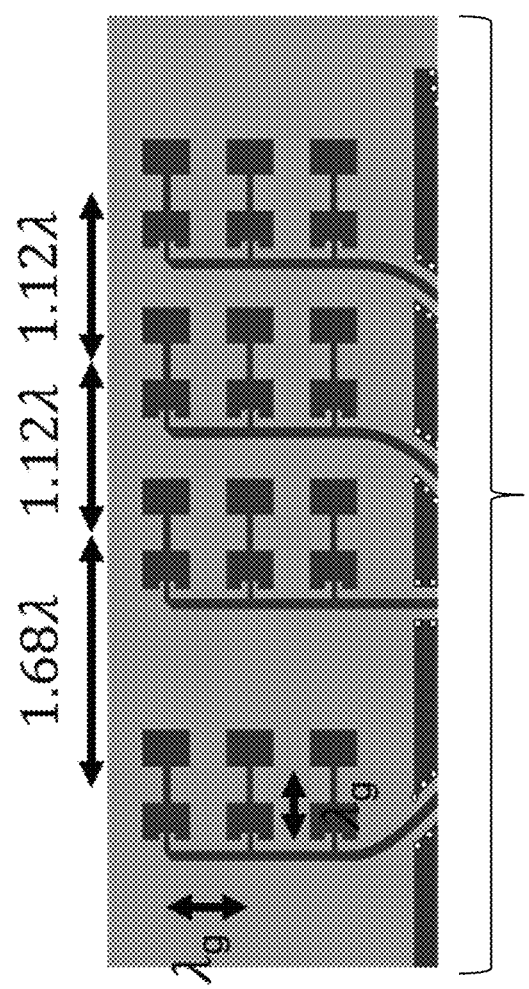

FIG. 10 shows exemplary antenna spacing for the antenna system of FIG. 8 in accordance with an embodiment of the present disclosure. The dimensions provided in FIG. 10 are shown by way of example and are not limiting. FIG. 10 shows spacing of RX antennas 1002 and spacing of TX antennas 1004. In an embodiment, the patches of the subarray are separated by a guided wavelength ($\lambda_g$) for constructive interference at broadside.

In an embodiment, because of the large subarray size of the antenna system of FIG. 8, the antenna elements are spaced by more than 0.5λ. In FIG. 10, antenna elements are spaced by at least 1.12λ, where λ is the free-space wavelength at 77 GHz. Although such a large spacing can induce a grating lobe effect in the array factor, the grating lobes are somewhat suppressed by using a spacing of 1.68λ between two of the antennas.

Figure 11:
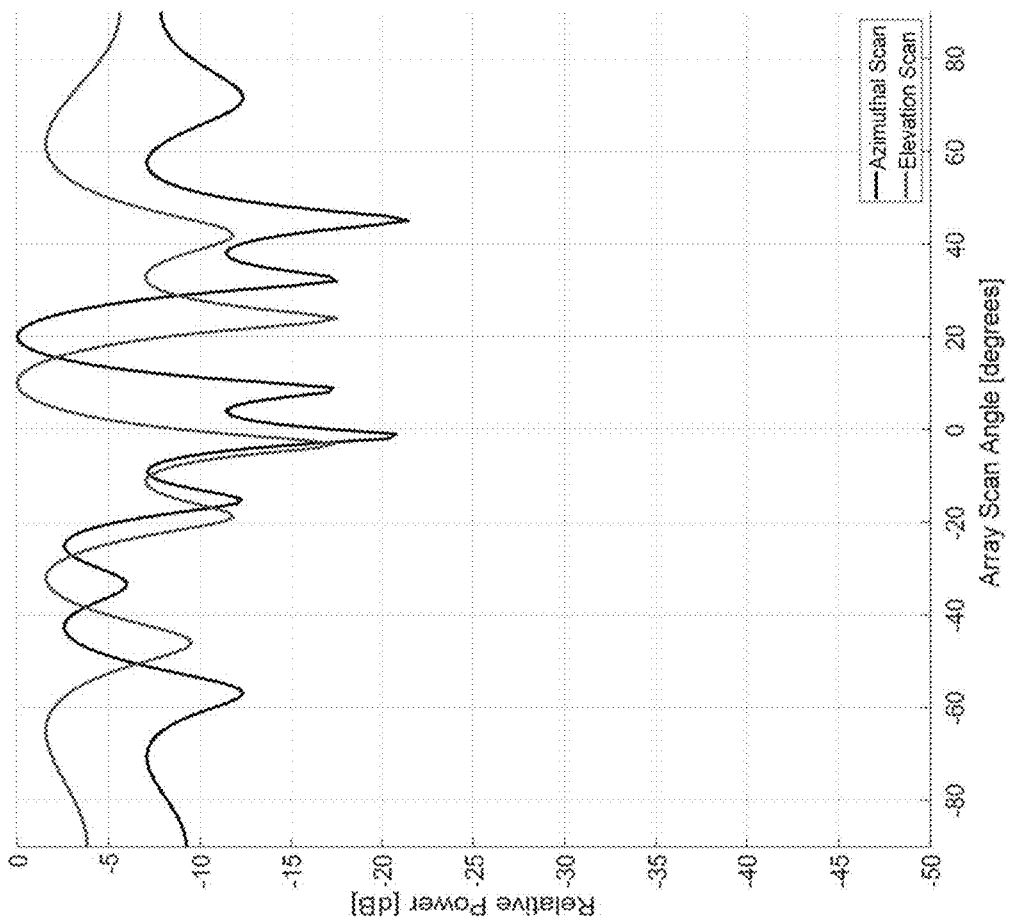
FIG. 11 shows a diagram of the resulting two-way array factor for a scan angle of 0° in accordance with an embodiment of the present disclosure.

FIG. 11 shows a diagram of the resulting two-way array factor for a scan angle of 0° in accordance with an embodiment of the present disclosure. In the azimuthal plane, where scanning is controlled by the 4 RX antennas, the grating lobe is suppressed to −2.5 dB. In the elevation plane, where scanning is controlled by the 3 TX antennas, the grating lobe is suppressed to −1.5 dB. In an embodiment, this high sidelobe level has two implications: (1) ground clutter or other sources of clutter could be illuminated by the high sidelobe and obscure the object of interest and (2) erroneous direction-of-arrival calculation.

In an embodiment, for 0° and 10° steering angles, the resulting radiation pattern is a pencil-beam shape with low sidelobe levels. Thus, good angular filtering is achieved. Moreover, the high sidelobes of the array factor are filtered by the subarray pattern. However, as the radar steers to 20° and beyond, the pencil-beam quality collapses, resulting in poor angular filtering within the beamwidth of the subarray pattern. The effect is that there is greater chance that clutter illuminated by a sidelobe will obscure the object of interest. Although this degradation of angular filtering is not desired, it is a tradeoff we are willing to make and is not detrimental to a UAV application. Indeed, it there is limited clutter in aerial UAV applications, where altitudes of operation are typically 20 to 50 meters. To reduce ground clutter further, we point the radar face away from the ground, detecting objects from a lower altitude.

In an embodiment, the second implication of high sidelobes is potentially erroneous direction-of-arrival estimation. The direction-of-arrival can be calculated by finding the array factor scan direction that maximizes the received power from the object signal. In an embodiment, this technique can be implemented in software, due to the digital beamforming capabilities of the radar system. For example, if an object is located at 20° in azimuth and 10° in elevation, the resulting angular scan yields the plots provided in FIG. 11 (assuming no clutter or noise). Note that the relative values within the angular scan depend only on the array factor and not the subarray pattern. Although the sidelobes are somewhat large, the correct scan direction can still be determined by finding the scan direction yielding the highest received power.

Figure 12:
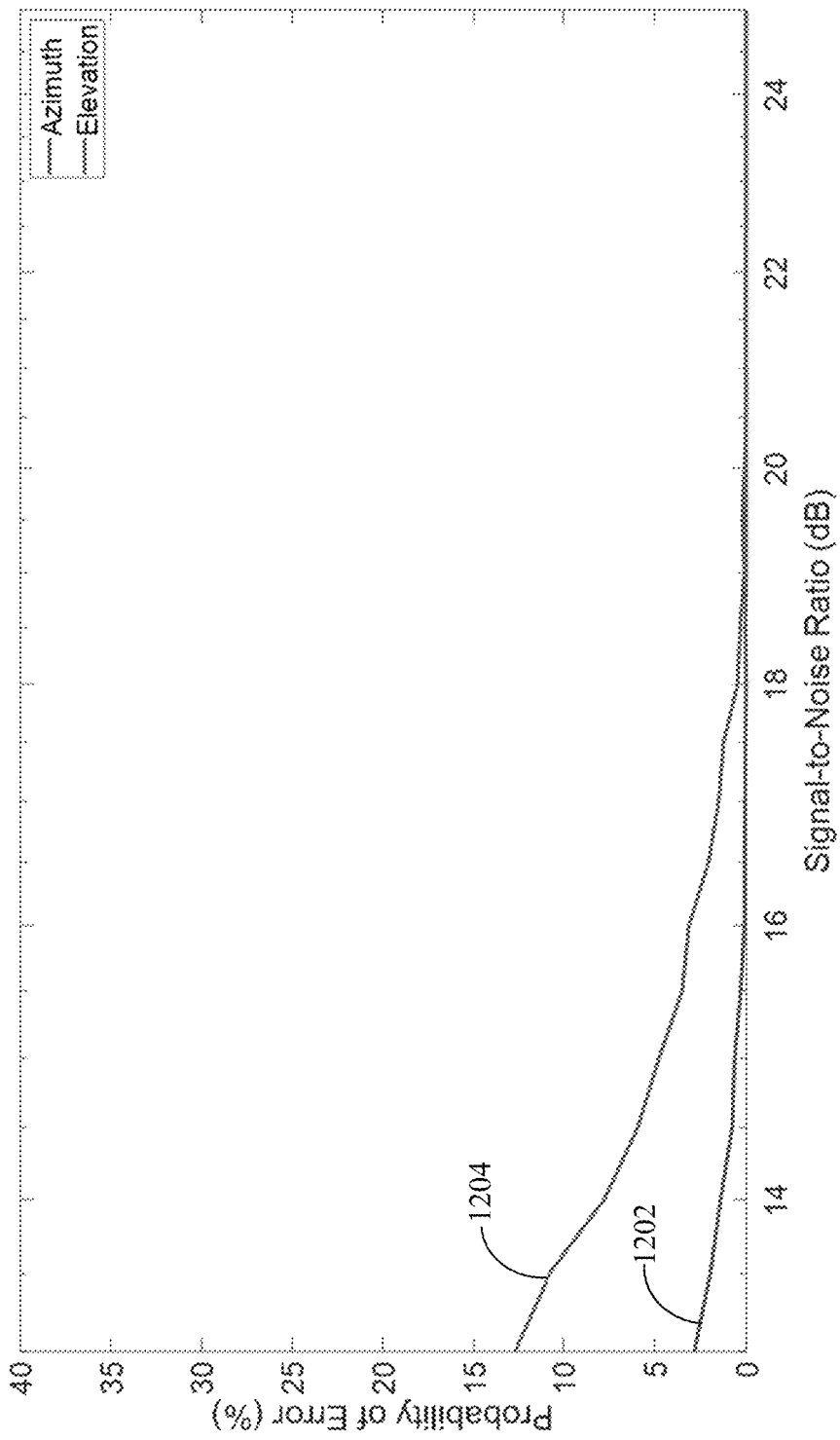
FIG. 12 shows the probability of erroneous direction estimates for different values of signal-to-noise ratio, as calculated from a Monte Carlo simulation, for azimuth and elevation in accordance with an embodiment of the present disclosure.

In the presence of noise, however, these high sidelobes may lead to erroneous direction estimates. FIG. 12 shows the probability of erroneous direction estimates for different values of signal-to-noise ratio, as calculated from a Monte Carlo simulation, for azimuth 1202 and elevation 1204 in accordance with an embodiment of the present disclosure. Note that the probability of error in elevation is higher, due to the higher sidelobe level in the elevation scan. Although these errors are not desired, they are not detrimental to the system performance. Indeed, these erroneous direction estimates can simply be filtered out by the radar's tracking filter. Clutter does not significantly affect the direction estimate. Indeed, if the object was detected, then the clutter in the sidelobe is much lower (10 dB or more) than the object signal. This has no appreciable effect on the direction-of-arrival estimation. Thus, with regard to clutter, we are concerned primarily about obscuration of the object.

Figure 13:
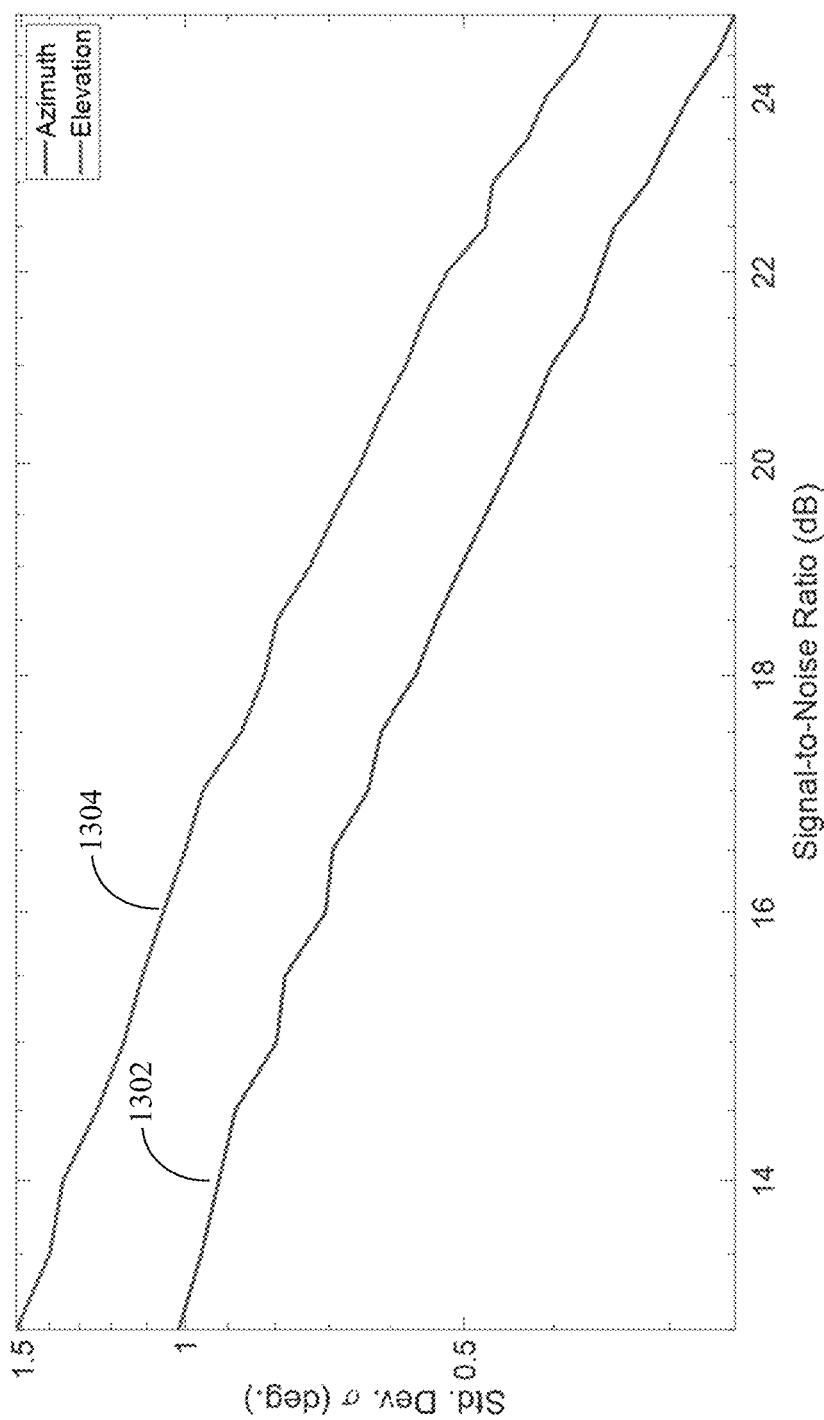
FIG. 13 shows the standard deviation of the direction-of-arrival estimation for azimuth and elevation in accordance with an embodiment of the present disclosure.

FIG. 13 shows the standard deviation of the direction-of-arrival estimation for azimuth 1302 and elevation 1304 in accordance with an embodiment of the present disclosure. Note that the accuracy is better in azimuth, since the 4 RX antennas are responsible for scanning in azimuth and form a longer baseline than the 3 TX antennas that are responsible for scanning in elevation.

6. Exemplary Subarray Design

In an embodiment, subarray elements are designed to maximize impedance bandwidth and tolerance to fabrication error. To this end, in an embodiment, the input reflection coefficient $S_{11}$ should wrap around the center of the Smith Chart.

Figure 14:
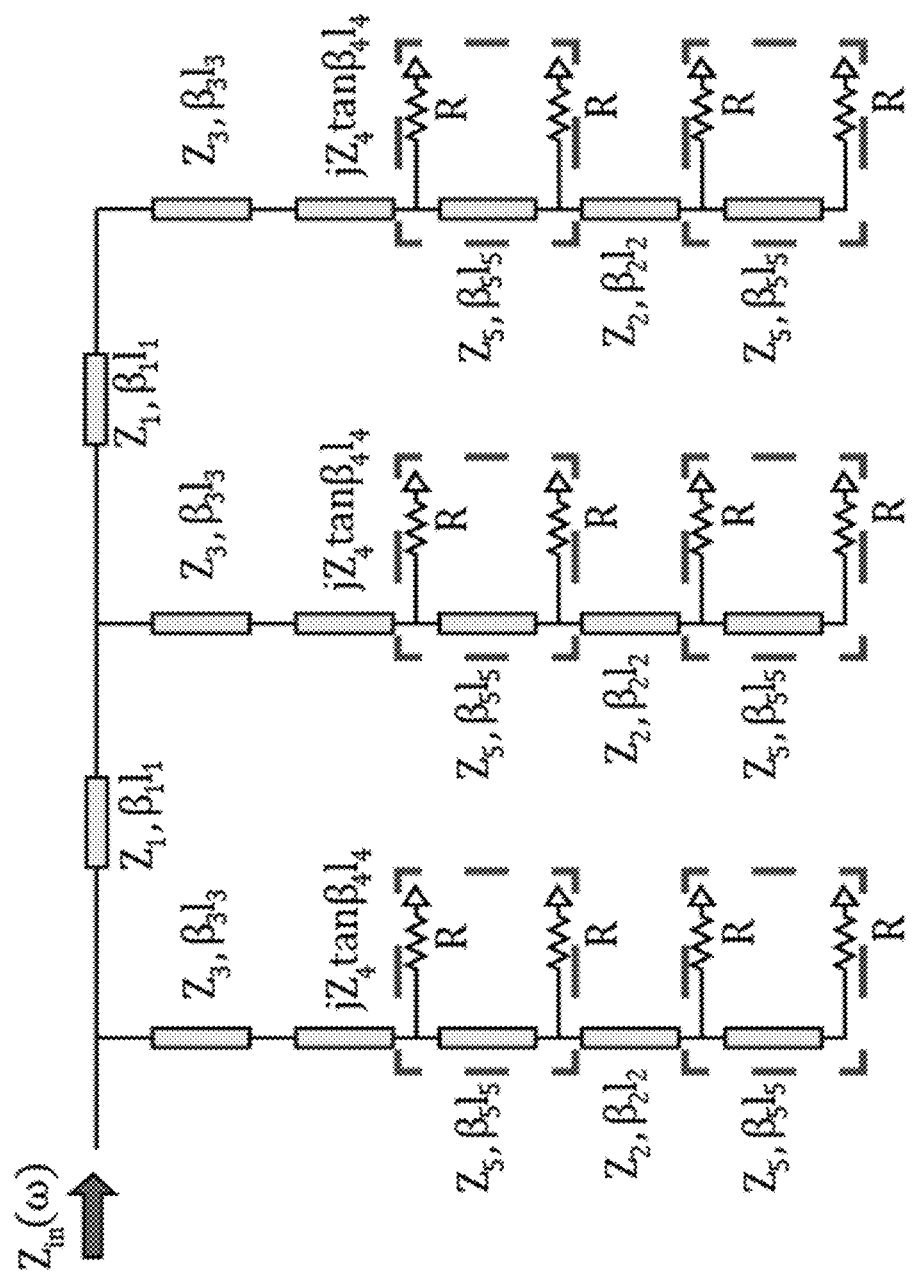
FIG. 14 shows an exemplary equivalent circuit model for RX antennas in accordance with an embodiment of the present disclosure.
Figure 15:
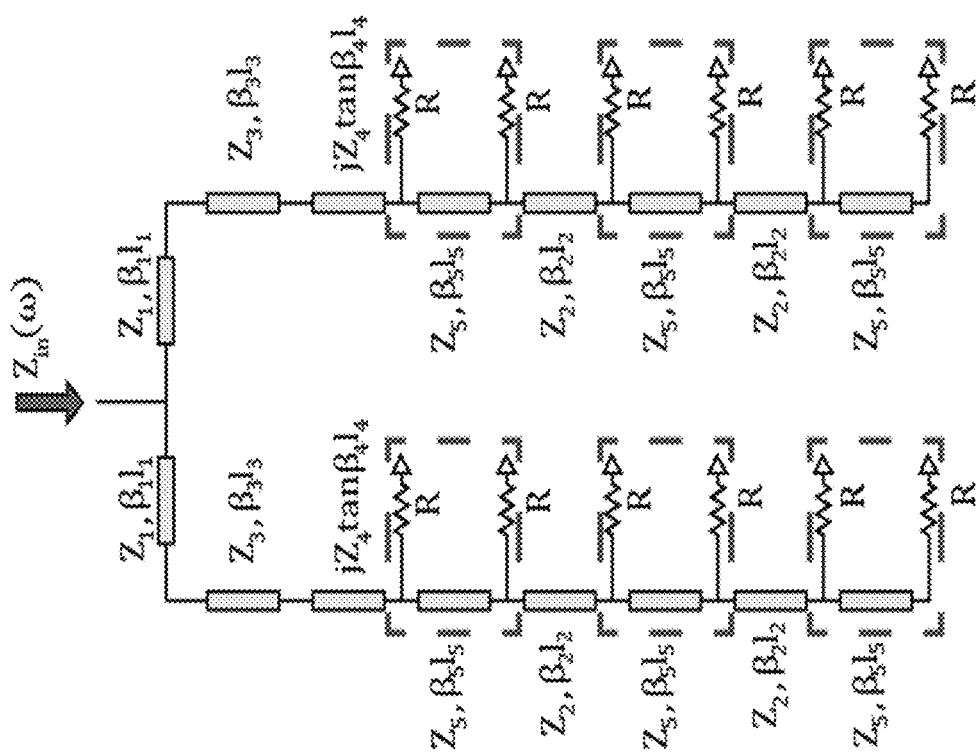
FIG. 15 shows an exemplary equivalent circuit model for TX antennas in accordance with an embodiment of the present disclosure.

FIG. 14 shows an exemplary equivalent circuit model for RX antennas in accordance with an embodiment of the present disclosure. FIG. 15 shows an exemplary equivalent circuit model for TX antennas in accordance with an embodiment of the present disclosure. In FIGS. 14 and 15, the patches are represented by low-impedance transmission lines, with 180° electrical length at resonance and radiation represented by shunt resistances. An inset feed is represented by a short-circuited series stub transmission line, yielding a series impedance of $jZ_4 \tan \beta_4 l_4$. In an embodiment, to obtain a subarray with radiation directed to broadside, the following criteria are used: $\beta_1 l_1 = 360°$ and $\beta_2 l_2 = \beta_5 l_5 = 180°$.

In an embodiment, the return loss is designed to be symmetric on either side of the design frequency to promote tolerance to fabrication error. In an embodiment, it can be shown that this occurs if the combination of the transmission line 3 and the inset feed (represented by the series stub) can be modeled as a transmission line of electrical length that is a multiple of a quarter-wavelength. In an embodiment, to minimize the size of the subarray, $\lambda/4$ is chosen. In an embodiment, the size of the inset feed is chosen to produce a broad bandwidth and low return loss.

Figure 16:
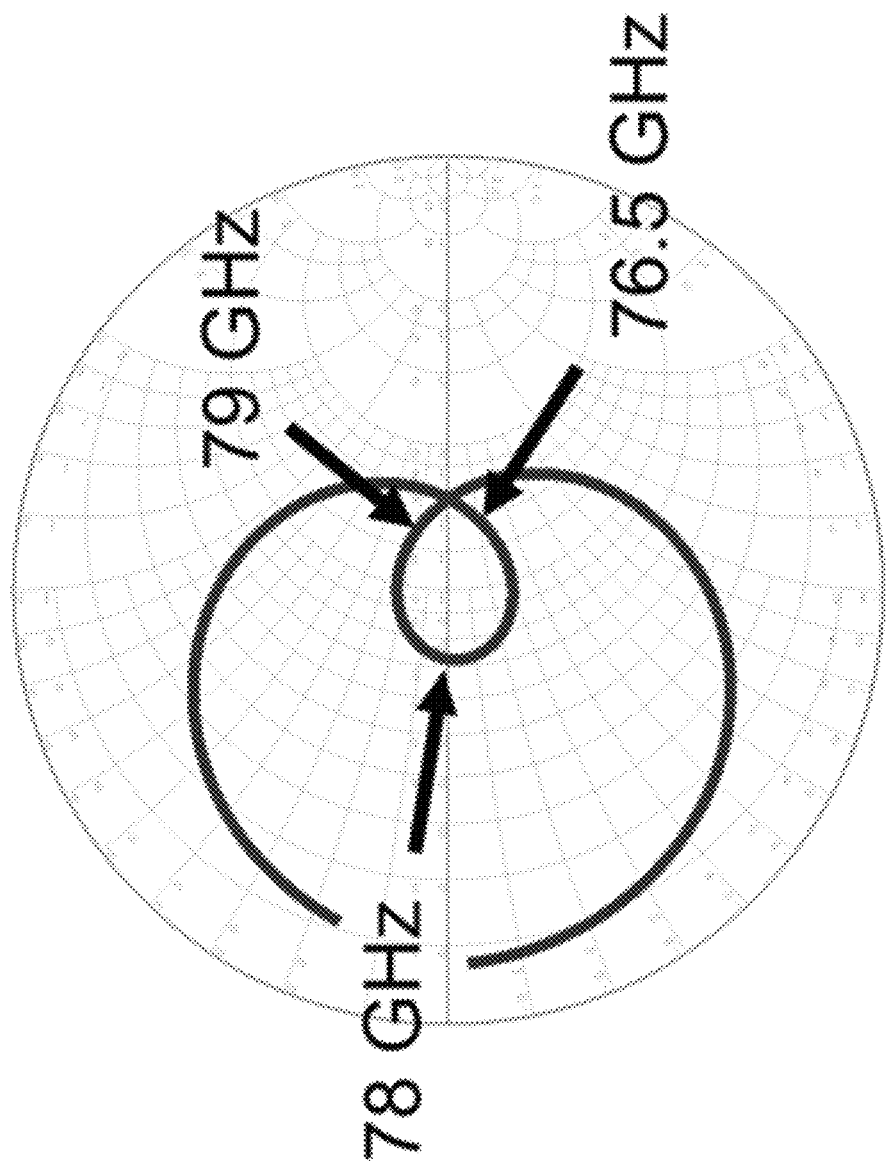
FIG. 16 shows a Smith Chart for an input reflection coefficient of an exemplary RX subarray in accordance with an embodiment of the present disclosure.
Figure 17:
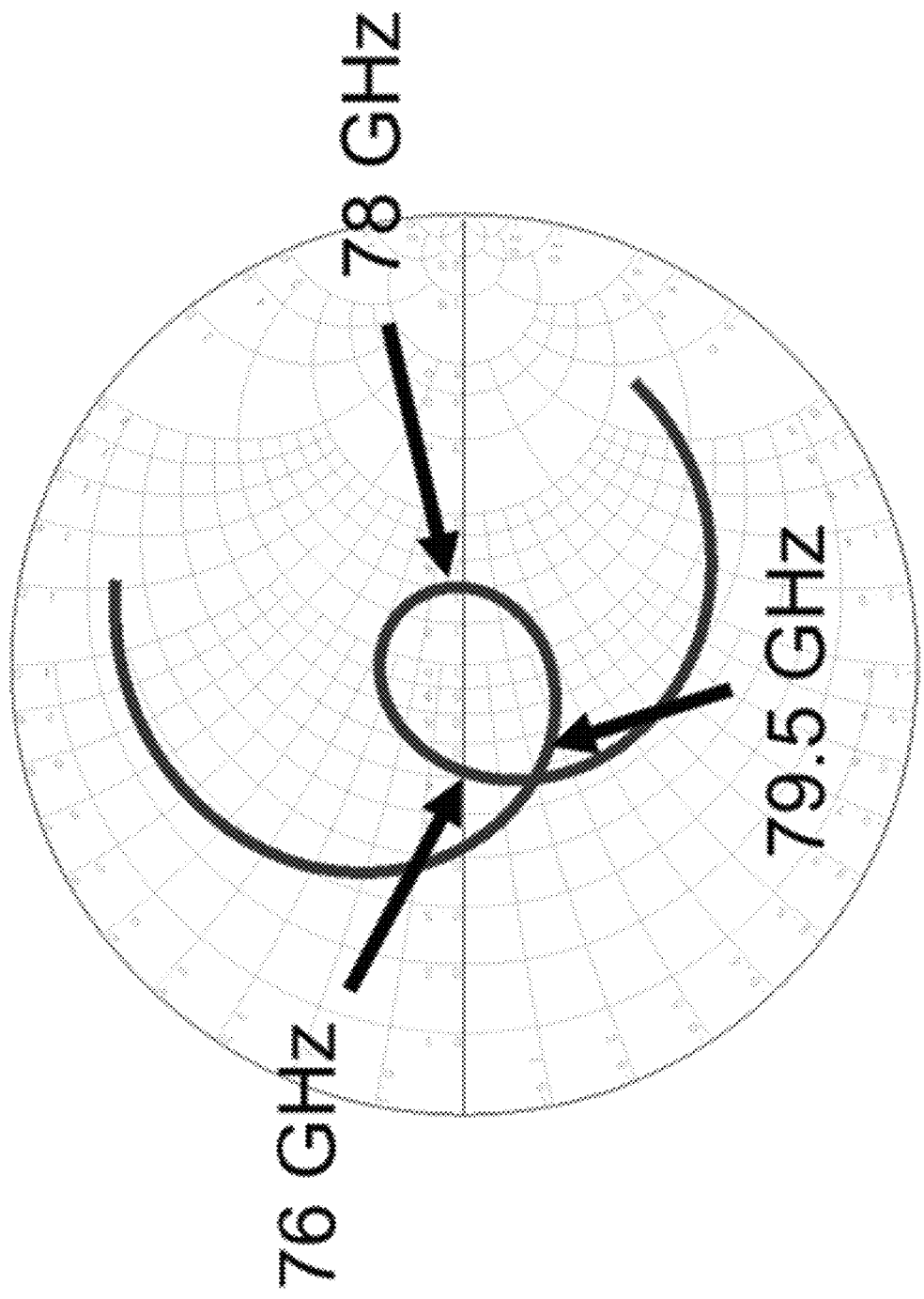
FIG. 17 shows a Smith Chart for an input reflection coefficient of an exemplary TX subarray in accordance with an embodiment of the present disclosure.
Figure 18:
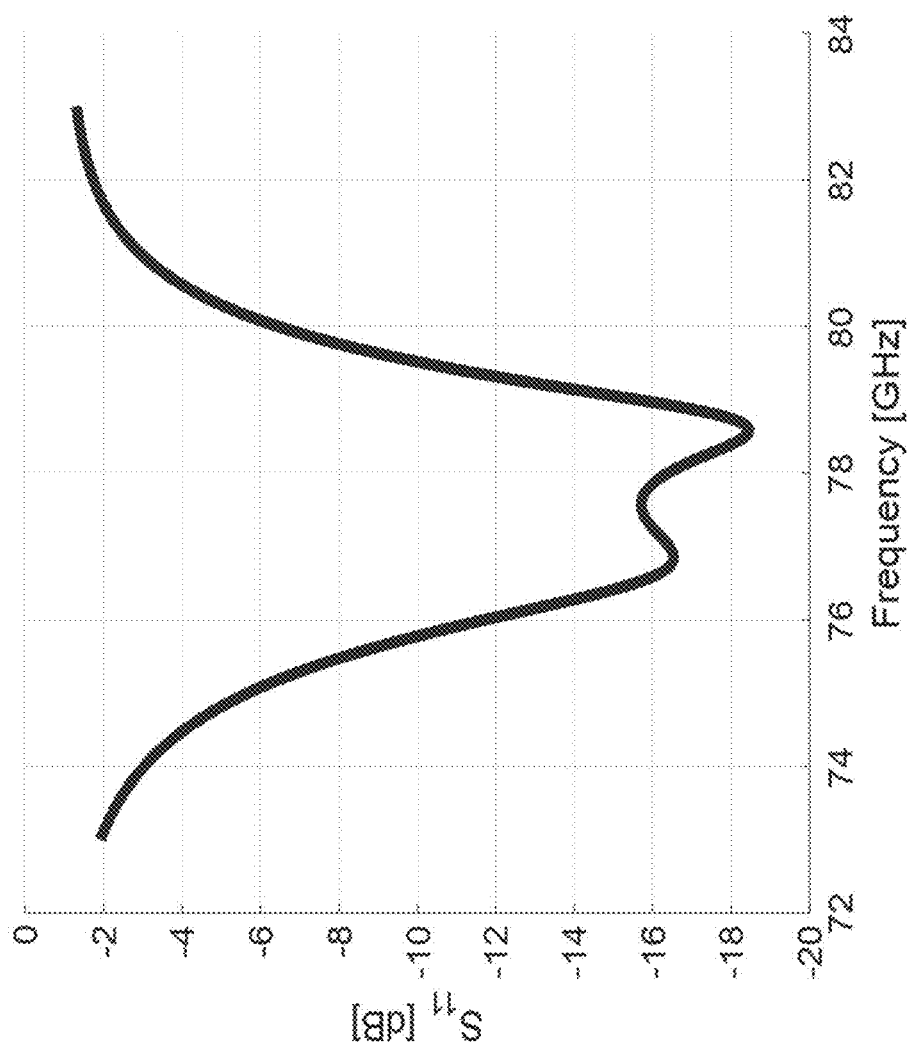
FIG. 18 shows a magnitude plot for an input reflection coefficient of an exemplary RX subarray in accordance with an embodiment of the present disclosure.
Figure 19:
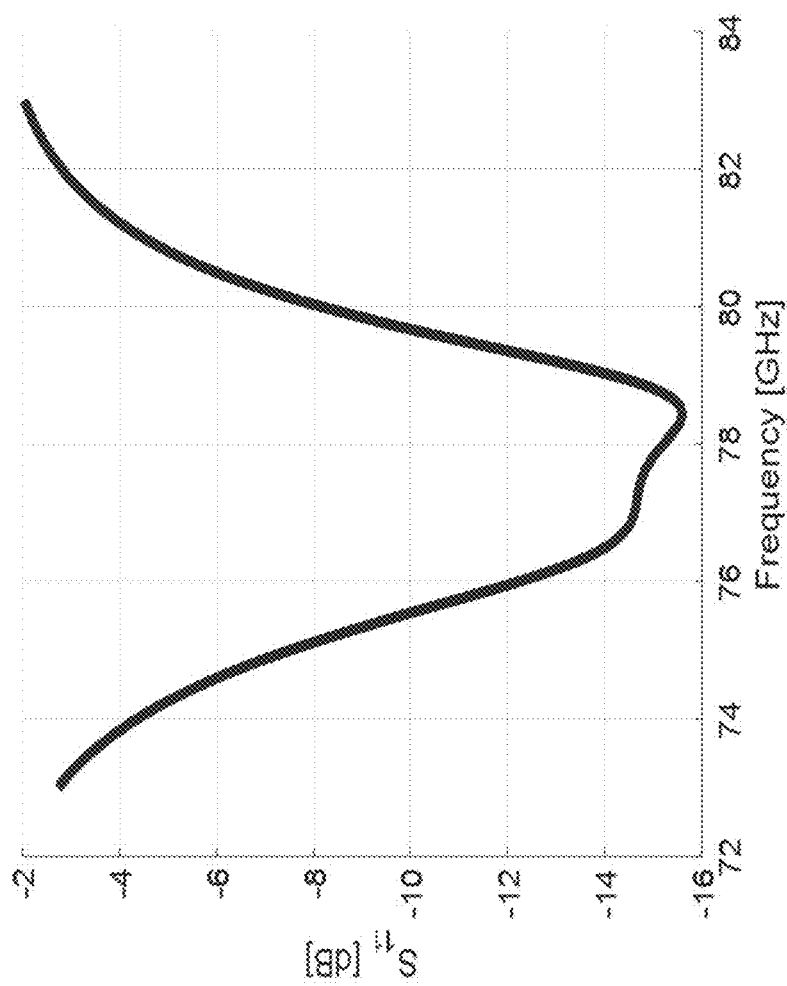
FIG. 19 shows a magnitude plot for an input reflection coefficient of an exemplary TX subarray in accordance with an embodiment of the present disclosure.

FIG. 16 shows a Smith Chart for an input reflection coefficient of an exemplary RX subarray in accordance with an embodiment of the present disclosure. FIG. 17 shows a Smith Chart for an input reflection coefficient of an exemplary TX subarray in accordance with an embodiment of the present disclosure. FIG. 18 shows a magnitude plot for an input reflection coefficient of an exemplary RX subarray in accordance with an embodiment of the present disclosure. FIG. 19 shows a magnitude plot for an input reflection coefficient of an exemplary TX subarray in accordance with an embodiment of the present disclosure. These plots show a 10 dB return loss bandwidth of approximately 4 GHz for each subarray. Note that an antenna taper could also be applied by varying the width of the subarray patches. However, no taper is employed in this design in accordance.

Figure 20:
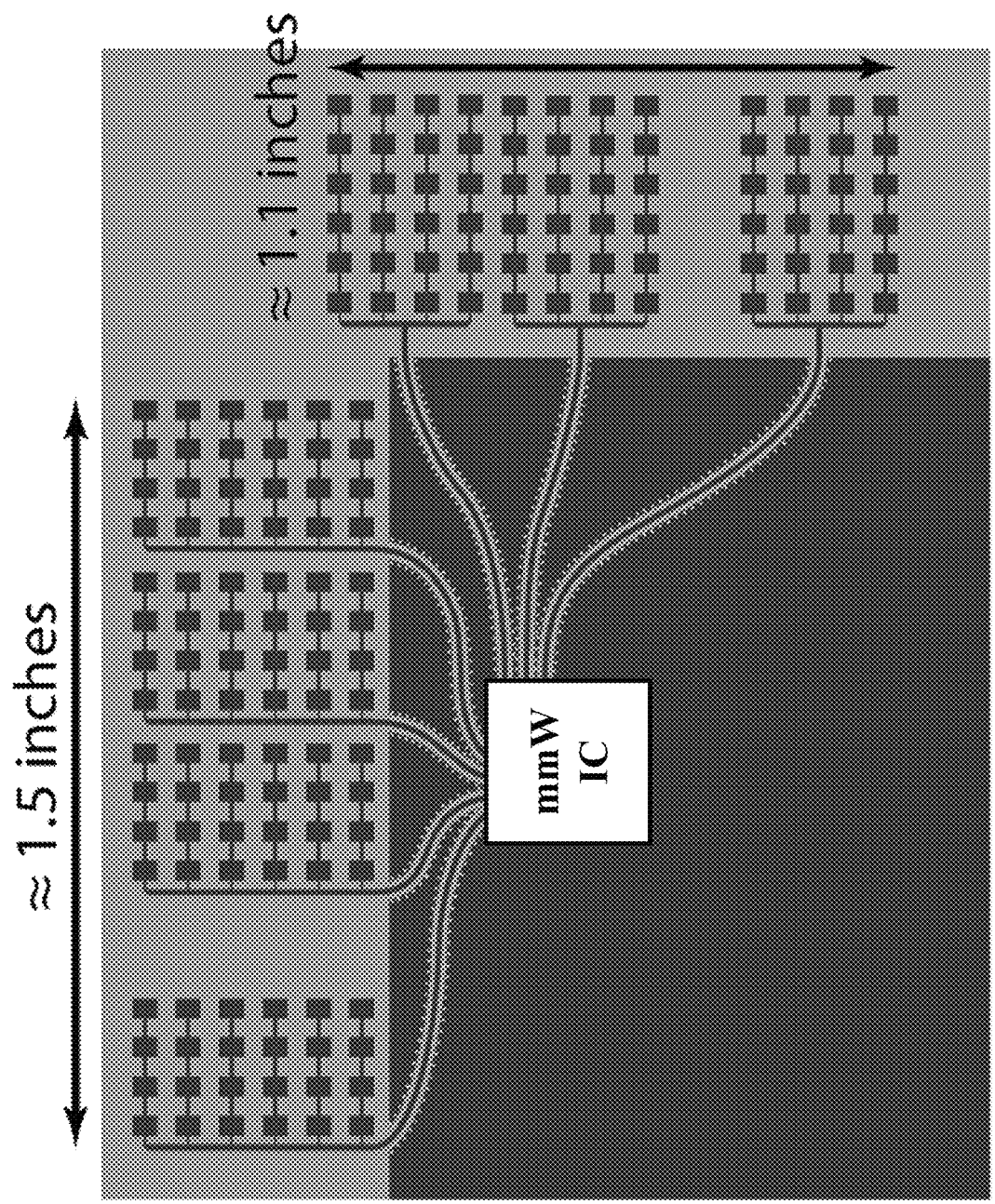
FIG. 20 shows a design of an exemplary antenna system with larger subarrays in accordance with an embodiment of the present disclosure.

FIG. 20 shows a design of an exemplary antenna system with larger subarrays in accordance with an embodiment of the present disclosure. FIG. 20 shows 4 by 6 subarrays for longer detection range but a subarray beamwidth of approximately 15° in azimuth and 15° in elevation.

7. Extending Radar Detection Range

In an embodiment, the radar detection range can be extended by improving the antenna efficiency using air-filled substrate integrated waveguides and by extending the coherent integration time using a bank of second-order matched filters.

In an embodiment, antennas and antenna feedlines are realized using microstrip technology. For example, it is estimated that using microstrip instead of waveguide for the antennas and antenna feedlines results in 5 dB or more of system loss. Eliminating this loss would result in a detection range increase of 33%. However, it is difficult to integrate machined waveguide with the radar printed circuit board (PCB). A more feasible alternative is to use substrate-integrated waveguides (SIWs). SIWs are essentially waveguides manufactured using standard PCB processes. The top and bottom of the waveguide are made from the copper sheets of the PCB while the waveguide's metallic side walls are emulated with rows of closely-spaced metallic vias. At W-band, the loss of SIWs has been measured to be close to 0.5 dB/inch. This loss is almost entirely due to loss in the dielectric substrate, rather than conductive loss.

Another alternative is to use an air-filled substrate integrated waveguide (AFSIW). This technology is similar to SIW with the exception that the dielectric material inside the waveguide has been largely replaced by air, thereby mitigating dielectric loss. AFSIW technology presents several design challenges, such as: (1) manufacturability; (2) mechanical stability; (3) mitigation of grating lobes from slot subarrays; (4) transition from the radar IC down into the AFSIW inner layer; and (5) efficient slot radiation. However, if these challenges can be overcome, the radar system could see an extension of radar range by as much as 30%-40%.

Another way to extend the radar's detection range is to extend the coherent integration time. Indeed, each doubling of the coherent integration time yields 3 dB more radar system gain (19% more range). However, this is not simple, since phase coherence is difficult to maintain for long periods of time, especially at millimeter-wave frequencies.

In an embodiment, the radar employs standard range-Doppler processing, which corrects for first-order (linear) chirp-to-chirp phase changes in the signal reflected from the object. As long as this first-order behavior is maintained, the system gain increases by 3 dB for every doubling of integration time. However, object and/or radar acceleration will inevitably occur. When this happens, gains of less than 3 dB (possibly negative) will occur for a doubling of the integration time.

However, if a radar system in accordance with an embodiment of the present disclosure can correct for second-order chirp-to-chirp phase changes, then the limit on coherent integration time can be extended. With sufficient computational resources, a large bank of matched filters can be used to correct for second-order phase deviation.

In an embodiment, to derive this bank of matched filters, the form received radar signal is derived under second-order motion. A series of transmitted FMCW chirps is proportional to:

$$v_{TX}(t+mP) = \exp\left(2\pi f_1 t + \frac{\pi \beta t^2}{\tau}\right) \quad (7)$$

where m denotes the $m^{th}$ chirp and P is the chirp periodicity. The returned signal is time-delayed and proportional to:

$$v_{RX}(t+mP) = \exp\left(2\pi f_1(t-t_d) + \frac{\pi \beta(t-t_d)^2}{\tau}\right) \quad (8)$$

where $t_d$ is the time delay between transmitting the signal and receiving a signal return. After stretch processing, the received signal is proportional to:

$$y(t) = \exp\left(2\pi f_1 \tau_d + \frac{\pi \beta}{\tau}(2t_d t - t_d^2)\right) \quad (9)$$

For an object at range R with range-rate v and range-acceleration-rate a, $t_d$ is given by:

$$t_d = \frac{2(R + vt + 1/2at^2)}{c} \quad (10)$$

Expression (10) can be generalized to the $M^{th}$ order as $$t_d = \frac{2}{c}\sum_{m=0}^{M}\frac{a_m}{m!}t^m \quad (11)$$

However, we will simply use (10) here, as we wish to look at second-order phase correction. In an embodiment, to derive an exemplary matched filter, time is discretized as follows:

$$t[\vec{n}]=n_1T_1+n_2T_2+n_3T_3(T_1<T_2<T_3) \quad (12)$$

Here, $T_1$ represents fast time sampling rate, and $T_2$ represents slow time sampling rate in the traditional radar sense. $T_3$ represents the next step beyond this: a slower-time sampling rate that can be thought of as sampling acceleration. Substituting (10) and (12) into the conjugate of (9) yields a matched filter for an object characterized by second-order motion.

$$Y[R,v,a] = \sum_{n_1=0}^{N_1-1} e^{-j4\pi\left(\frac{\beta}{c\tau}n_1T_1\right)R} \sum_{n_2=0}^{N_2-1}\sum_{n_3=0}^{N_3-1} y[\vec{n}] \quad (13)$$

$$e^{-j4\pi\left(\frac{f_1}{c}+\frac{\beta}{c\tau}n_1T_1\right)v(n_1T_1+n_2T_2+n_3T_3)+a/2(n_1T_1+n_2T_2+n_3T_3)^2\}}$$

In an embodiment, the R, v, and a variables should be discretized. The discretization can be established as follows:

$$\frac{k_1}{N_1} = \frac{2\beta R}{c\tau}T_1 \quad (14)$$

$$\frac{k_2}{N_2} = \frac{2f_1vT_2}{c} \quad (15)$$

$$k_3 = \frac{2af_1T_2N_2T_3N_3}{c} \quad (16)$$

This discretization can be generalized for higher-order cases as follows:

$$k_m = \frac{2a_{m-1}f_1\Pi_{i=1}^{m}T_iN_i}{c} \quad (17)$$

Figure 21:
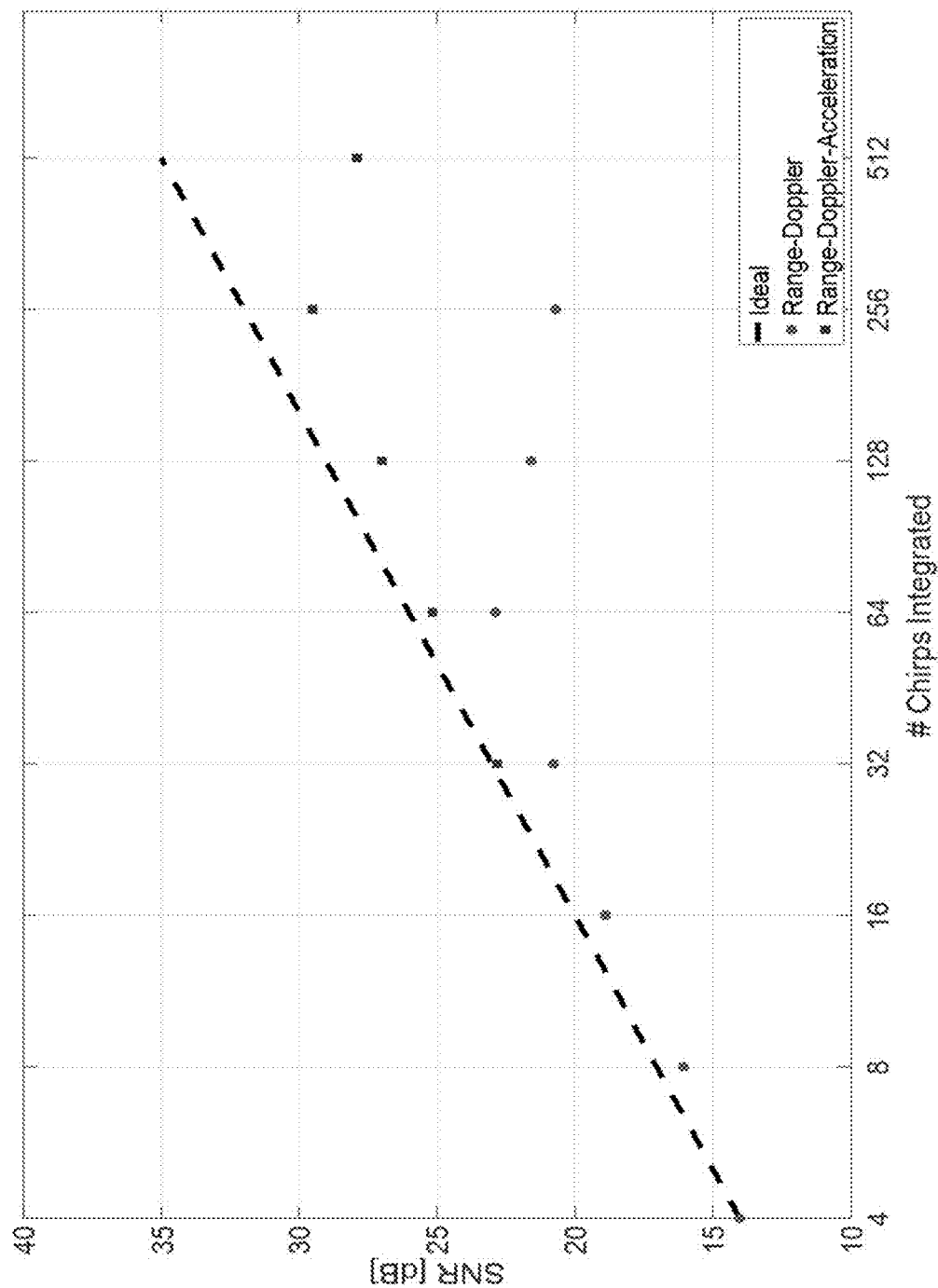
FIG. 21 shows exemplary experimental results for a second order-matched filter in accordance with an embodiment of the present disclosure.

FIG. 21 shows exemplary experimental results for a second order-matched filter in accordance with an embodiment of the present disclosure. In an embodiment, the object to be detected for the experiment of FIG. 21 is a small UAV situated 40 meters from the radar. The results provided in FIG. 21 show that a greater than 6 dB SNR improvement using the second-order matched filter, which is referred to here as a range-Doppler-acceleration map technique.

8. Exemplary Methods for Detecting Objects

As discussed above, the maximum detection range of a given object to be detected can be expanded by extending the coherent integration time of radar signals that reflect from that object. In an embodiment, this is done by expanding the radar's bank of matched filters to include second-order phase correction. This bank of matched filters can be implemented in hardware, software, and/or a combination of hardware and software in accordance with embodiments of the present disclosure. In an embodiment, a second-order phase correction extends the length of time for which received signals remain coherent, thereby improving signal-to-noise ratio.

Figure 22:
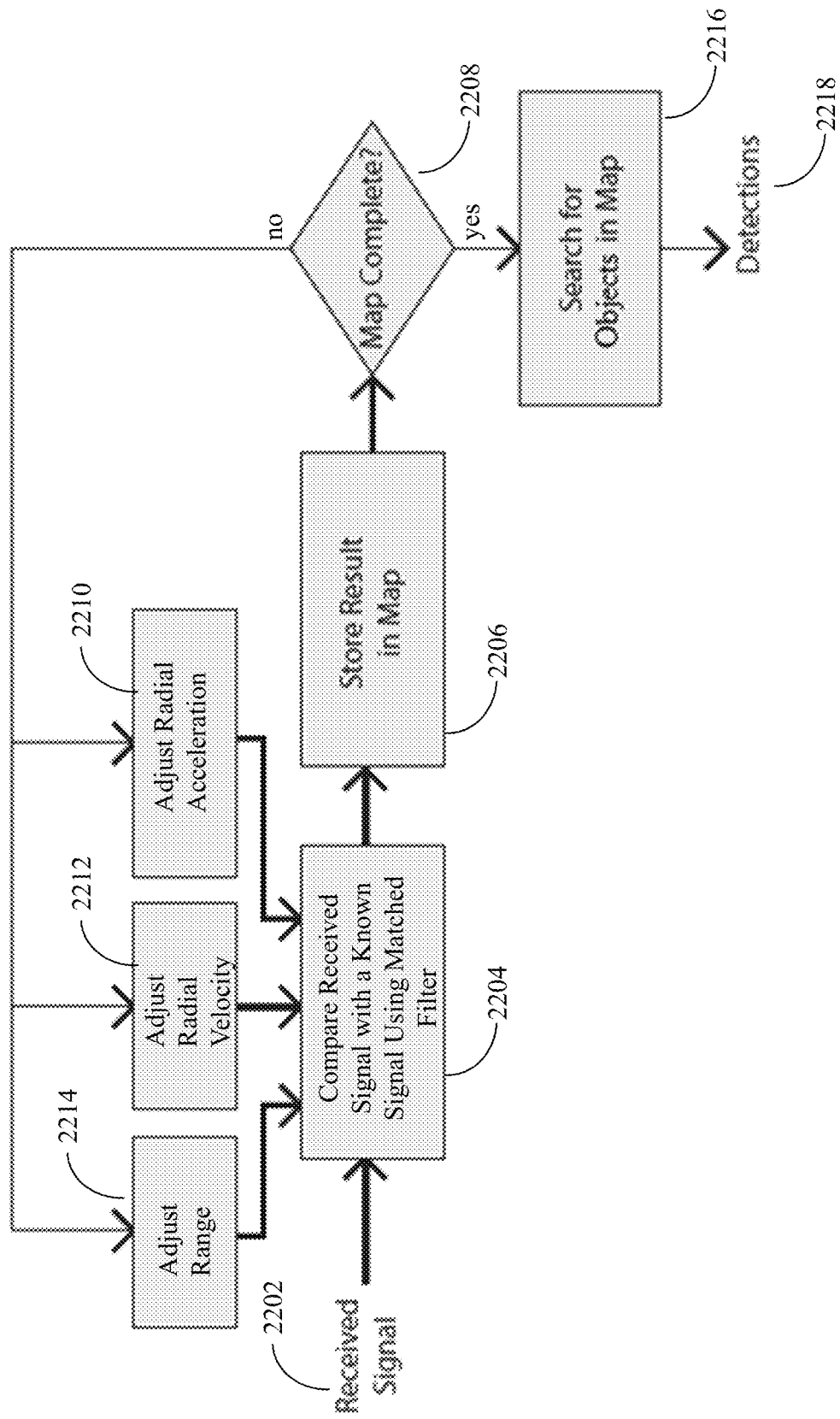
FIG. 22 is a flowchart of an exemplary method for detecting objects in accordance with an embodiment of the present disclosure.

FIG. 22 is a flowchart of an exemplary method for detecting objects in accordance with an embodiment of the present disclosure. In an embodiment, the steps of FIG. 22 are performed using a GPU, such as GPU 704. In step 2204, a received signal 2202 is sent to a matched filter. As discussed above, the matched filter can be implemented using hardware, software, and/or a combination of hardware and software. In an embodiment, the matched filter is initialized with variables including variables for range, radial velocity, and radial acceleration. In an embodiment, these variables can be initialized to predetermined values at the start of the process and can be altered later in the method of FIG. 22 progresses, as discussed later.

In an embodiment, the matched filter compares received signal 2202 with one or more known signals to match (e.g., a known signal to detect stored in memory). For example, in an embodiment, the known signals correspond to signals transmitted by the radar system. In an embodiment, if the known signal is present in received signal 2202, the matched filter outputs a signal indicating that a match was present (e.g., in an embodiment, by generating signal spike). In step 2206, the result generated by the matched filter is stored in memory. In step 2208, a determination is made whether the map is complete. For example, in an embodiment, the map is determined to be complete when all known signals to search for in memory have been searched for by the matched filter.

If the map is not complete, the process proceeds to steps 2210, 2212, and 2214. In step 2210, the radial acceleration of the matched filter is altered. In step 2212, the radial velocity of the matched filter is altered. In step 2214, the range of the matched filter is altered. In an embodiment, the radial acceleration, radial velocity, and range of the matched filter are altered to tune the matched filter to search for the next known signal in memory. Once the matched filter is tuned, the matched filter searches for the presence of the next known signal in memory in received signal 2202.

In an embodiment, this process continues until the matched filter has searched for all known signals in memory, and a determination is made in step 2208 that the map is complete. In step 2216, objects to detect are searched for in the map, generating a plurality of detections 2218. For example, in an embodiment, the map generated in step 2206 can be searched for spikes indicating the presence of one or more matches with known signals (e.g., in an embodiment, indicated by signal spikes). In an embodiment, each of the detected matches indicates that an object (e.g., corresponding to a respective known signal) was detected.

Figure 23:
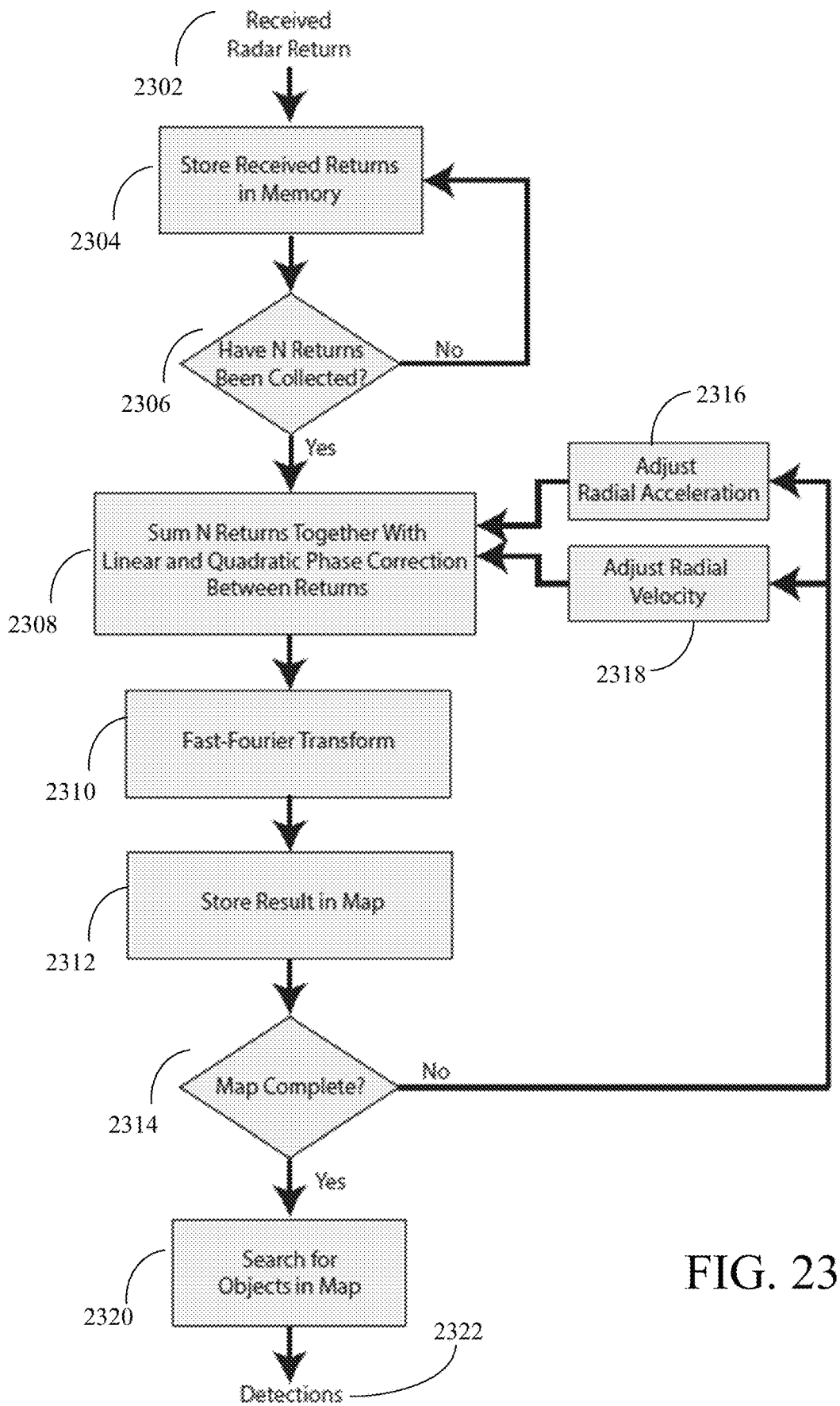
FIG. 23 is a flowchart of another exemplary method for detecting objects in accordance with an embodiment of the present disclosure.

FIG. 23 is a flowchart of another exemplary method for detecting objects in accordance with an embodiment of the present disclosure. In step 2304, received radar returns 2302 are stored in memory. In step 2306, a determination is made (e.g., by GPU 704 and/or MCU 710) whether a predetermined number of returns (N) have been collected. In an embodiment, this predetermined number can be configurable by a user. In an embodiment, this predetermined number can be determined to be reached when detected chirps become incoherent (e.g., when an incoherency of the chirps is beyond second order). If a predetermined number of returns has not been received, the method returns to step 2304 until the predetermined number of returns has been received, at which point the method proceeds to step 2308.

In step 2308, the received returns are summed together. In an embodiment, the received returns are summed together with linear and quadratic phase correction between returns. In step 2310, a Fast Fourier Transform (FFT) is performed on the summed returns. In step 2312, the result of the FFT is stored (e.g., in a map in memory).

In step 2314, a determination is made regarding whether the map is complete. For example, in an embodiment, the map can be determined to be complete once all possible accelerations and radial velocities have been checked. If the map is not complete, the method proceeds to steps 2316 and 2318 and then returns to step 2308. In step 2316, the radial acceleration is adjusted. In step 2318, the radial velocity is adjusted. For example, in an embodiment, a plurality of predetermined radial accelerations and velocities can be set to be used to adjust a matched filter, and an FFT can be performed on the received radar returns for each of these predetermined radial accelerations and velocities. In an embodiment, steps 2308-2318 can be performed until each of these predetermined radial accelerations and velocities has been used to adjust the matched filter to enable it to generate a result for detecting an object in the radar returns.

Once a determination is made in step 2314 that the map is complete, the method proceeds to step 2320, wherein objects to detect are searched for in the map, generating a plurality of detections 2322. For example, in an embodiment, the map can be searched for spikes indicating the presence of one or more matches with known signals (e.g., in an embodiment, indicated by signal spikes). In an embodiment, each of the detected matches indicates that an object (e.g., corresponding to a respective known signal) was detected.

The methods of FIGS. 22 and 23 can be performed using hardware, software, and/or a combination of hardware and software. In an embodiment, the methods of FIGS. 22 and 23 are performed by GPU 704. In an embodiment, the methods of FIGS. 22 and 23 are performed by MCU 710.

9. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A radar system, comprising:
    a millimeter wave (mmW) radar sensor;
    a graphical processing unit (GPU) coupled to the mmW radar sensor, wherein the GPU comprises a bank of matched filters;
    a first antenna subarray coupled to the mmW radar sensor;
    a second antenna subarray coupled to the mmW radar sensor; and
    a third antenna subarray coupled to the mmW radar sensor, wherein a first spacing between the first antenna subarray and the second antenna subarray is approximately 1.5 times a second spacing between the second antenna subarray and the third antenna subarray.

2. The radar system of claim 1, wherein the first spacing is $1.12\lambda$.

3. The radar system of claim 1, wherein the second spacing is $1.68\lambda$.

4. The radar system of claim 1, wherein the GPU comprises a bank of second-order matched filters configured to correct for second-order phase deviation.

5. The radar system of claim 1, wherein the bank of matched filters is configured to:
    compare a received signal with a plurality of known signals; and
    determine whether the received signal matches any of the known signal.

6. The radar system of claim 1, further comprising:
    a fourth antenna subarray, wherein the first antenna subarray, the second antenna subarray, and the third antenna subarray are parallel with each other, and wherein the fourth antenna subarray is vertically offset from the first antenna subarray, the second antenna subarray, and the third antenna subarray.

7. The radar system of claim 6, further comprising:
    a first antenna array configured to detect displacement of an object in an azimuthal plane, wherein the first antenna array comprises the first antenna subarray, the second antenna subarray, and the third antenna subarray; and
    a second antenna array configured to detect displacement of an object in an elevation plane, wherein the first antenna array comprises the fourth antenna subarray.

8. The radar system of claim 7, wherein the first antenna array further comprises a fifth antenna subarray adjacent to the second antenna subarray and parallel with the first antenna subarray, the second antenna subarray, and the third antenna subarray, and wherein a third spacing between the second antenna subarray and the fifth antenna subarray is approximately 1.5 times the second spacing between the second antenna subarray and the third antenna subarray.

9. The radar system of claim 8, wherein the second antenna array further comprises:
    a sixth antenna subarray adjacent to the fourth antenna subarray and parallel with the fourth antenna subarray;
    a seventh antenna subarray adjacent to the sixth antenna subarray and parallel with the sixth antenna subarray; and
    an eighth antenna subarray parallel with the fourth antenna subarray, the sixth antenna subarray, and the seventh antenna subarray, wherein a fourth spacing between the seventh antenna subarray and the eighth antenna subarray is approximately 1.5 times a fifth spacing between the fourth antenna subarray and the sixth antenna subarray and between the sixth antenna subarray and the seventh antenna subarray.

10. The radar system of claim 6, wherein the fourth antenna subarray comprises a 2 by 3 grid of microstrip patches.

11. The radar system of claim 1, wherein the first antenna subarray comprises a 2 by 3 grid of microstrip patches.

12. The radar system of claim 11, wherein the second antenna subarray comprises a 2 by 3 grid of microstrip patches, and wherein the third antenna subarray comprises a 2 by 3 grid of microstrip patches.

13. An unmanned aerial vehicle (UAV) comprising a radar system, the radar system comprising:
    a millimeter wave (mmW) radar sensor;
    a first antenna subarray coupled to the mmW radar sensor;
    a second antenna subarray coupled to the mmW radar sensor;
    a third antenna subarray coupled to the mmW radar sensor, wherein a first spacing between the first antenna subarray and the second antenna subarray is approximately 1.5 times a second spacing between the second antenna subarray and the third antenna subarray, and wherein the first antenna subarray, the second antenna subarray, and the third antenna subarray are parallel with each other;

a fourth antenna subarray coupled to the mmW radar sensor, wherein the fourth antenna subarray is vertically offset from the first antenna subarray, the second antenna subarray, and the third antenna subarray;

a fifth antenna subarray coupled to the mmW radar sensor; and a sixth antenna subarray coupled to the mmW radar sensor, wherein a third spacing between the fifth antenna subarray and the sixth antenna subarray is approximately equal to the first spacing, and wherein a fourth spacing between the fourth antenna subarray and the fifth antenna subarray is approximately equal to the second spacing, and wherein the fourth antenna subarray, the fifth antenna subarray, and the sixth antenna subarray are parallel with each other.

14. The UAV system of claim 13, further comprising a graphical processing unit (GPU) coupled to the mmW radar sensor, wherein the GPU comprises a bank of matched filters.

15. The UAV system of claim 14, wherein the GPU comprises a bank of second-order matched filters configured to correct for second-order phase deviation.

16. The UAV system of claim 14, wherein the bank of matched filters is configured to:

compare a received signal with a plurality of known signals; and determine whether the received signal matches any of the known signals.

17. A method for detecting an object using a radar system, the method comprising:

comparing a received signal with a first known signal using a matched filter and generating a first result;

altering a range, radial velocity, and radial acceleration of the matched filter to configure the matched filter to search for a second known signal;

comparing the received signal with the second known signal using the matched filter and generating a second result;

determining, based on the first result and the second result, whether an object was detected by the matched filter.

18. The method of claim 17, further comprising:

receiving a plurality of received signals including the received signal; and performing linear and quadratic phase correction between the received signals in the plurality of received signals, thereby generating a plurality of corrected received signals.

19. The method of claim 18, further comprising:

summing the corrected plurality of corrected received signals; and performing a Fast Fourier Transform on the plurality of corrected received signals.

\* \* \* \* \*